US012763074B2

(12) United States Patent
Poltorak

(10) Patent No.: US 12,763,074 B2
(45) Date of Patent: Oct. 13, 2026

(54) ELECTRONIC PERSONAL INTERACTIVE DEVICE

(71) Applicant: Poltorak Technologies LLC, Suffern, NY (US)

(72) Inventor: Alexander I. Poltorak, Monsey, NY (US)

(73) Assignee: Poltorak Technologies LLC, Pomona, NY (US)

( * ) Notice: Subject to any disclaimer, the term of this patent is extended or adjusted under 35 U.S.C. 154(b) by 982 days.

(21) Appl. No.: 17/664,469

(22) Filed: May 23, 2022

(65) Prior Publication Data

US 2022/0284896 A1 Sep. 8, 2022

Related U.S. Application Data

(63) Continuation of application No. 15/492,869, filed on Apr. 20, 2017, now Pat. No. 11,367,435, and a (Continued)

(51) Int. Cl.

| | |
|---|---|
| ***G06N 20/00*** | (2019.01) |
| ***G06F 3/01*** | (2006.01) |
| ***G06F 3/16*** | (2006.01) |
| ***G06F 16/435*** | (2019.01) |
| ***G06T 13/20*** | (2011.01) |

(Continued)

(52) U.S. Cl.

CPC .............. *G10L 15/22* (2013.01); *G06F 3/017* (2013.01); *G06F 3/167* (2013.01); *G06F 16/435* (2019.01); *G06T 13/205* (2013.01); *G06V 40/174* (2022.01); *G06V 40/28* (2022.01); *G10L 13/00* (2013.01); *G10L 13/033* (2013.01); *G10L 15/142* (2013.01); *G10L 15/16* (2013.01); *G10L 15/1815* (2013.01); *G10L 15/30* (2013.01); *G10L 25/63* (2013.01); *H04L 12/2818* (2013.01); *G10L 2015/223* (2013.01);

(Continued)

(58) Field of Classification Search

None

See application file for complete search history.

(56) References Cited

U.S. PATENT DOCUMENTS

| | | | | | |
|---|---|---|---|---|---|
| 2008/0221892 | A1* | 9/2008 | Nathan | G06F 40/35 | 704/9 |
| 2011/0014932 | A1* | 1/2011 | Estevez | G01S 19/14 | 455/466 |

FOREIGN PATENT DOCUMENTS

| | | | | |
|---|---|---|---|---|
| GB | 2450757 A * | 1/2009 | | H04L 67/131 |

OTHER PUBLICATIONS

Gill (Year: 2009).*

* cited by examiner

*Primary Examiner* — David R Vincent

(74) *Attorney, Agent, or Firm* — Hoffberg & Associates; Steven M. Hoffberg

(57) ABSTRACT

An interface device and method of use, comprising audio and image inputs; a processor for determining topics of interest, and receiving information of interest to the user from a remote resource; an audio-visual output for presenting an anthropomorphic object conveying the received information, having a selectively defined and adaptively alterable mood; an external communication device adapted to remotely communicate at least a voice conversation with a human user of the personal interface device. Also provided is a system and method adapted to receive logic for, synthesize, and engage in conversation dependent on received conversational logic and a personality.

18 Claims, 8 Drawing Sheets

Related U.S. Application Data continuation of application No. 15/492,833, filed on Apr. 20, 2017, now Pat. No. 11,341,962, said application No. 15/492,869 is a continuation of application No. 13/106,575, filed on May 12, 2011, now Pat. No. 9,634,855, said application No. 15/492,833 is a continuation of application No. 13/106,575, filed on May 12, 2011, now Pat. No. 9,634,855.

(60) Provisional application No. 61/334,564, filed on May 13, 2010.

(51) Int. Cl.

| | |
|---|---|
| ***G06V 40/16*** | (2022.01) |
| ***G06V 40/20*** | (2022.01) |
| ***G10L 13/00*** | (2006.01) |
| ***G10L 13/033*** | (2013.01) |
| ***G10L 15/14*** | (2006.01) |
| ***G10L 15/16*** | (2006.01) |
| ***G10L 15/18*** | (2013.01) |
| ***G10L 15/22*** | (2006.01) |
| ***G10L 15/30*** | (2013.01) |
| ***G10L 25/63*** | (2013.01) |
| ***H04L 12/28*** | (2006.01) |
| *H04M 1/02* | (2006.01) |
| *H04W 84/12* | (2009.01) |
| *H04W 84/18* | (2009.01) |

(52) U.S. Cl.

CPC ...... *H04M 1/0202* (2013.01); *H04M 2250/10* (2013.01); *H04W 84/12* (2013.01); *H04W 84/18* (2013.01)

ELECTRONIC PERSONAL INTERACTIVE DEVICE

CROSS-REFERENCE TO RELATED PROVISIONAL APPLICATION

This application is a

Continuation of U.S. patent application Ser. No. 15/492,869, filed Apr. 20, 2017, now U.S. Pat. No. 11,367,435 issued Jun. 21, 2022, and is a Continuation of U.S. patent application Ser. No. 15/492,833, filed Apr. 20, 2017, now U.S. Pat. No. 11,341,962, issued May 24, 2022, which is a Continuation of U.S. patent application Ser. No. 13/106,575, filed May 12, 2011, now U.S. Pat. No. 9,634,855, issued Apr. 25, 2017, which claims priority benefit of provisional U.S. Patent Application Ser. No. 61/334,564, entitled ELECTRONIC PERSONAL INTERACTIVE DEVICE, filed on May 13, 2010, which applications are hereby expressly incorporated by reference in their entirety, including all Figures, Tables, and Claims.

FIELD OF THE INVENTION

The present invention relates generally to consumer electronics and telecommunications, and, more particularly, to personal devices having social human-machine user interfaces.

BACKGROUND OF THE INVENTION

Many systems and methods intended for use by elderly people are known in the art. Elderly people as a group have less developed technological skills than younger generations. These people may also have various disabilities or degraded capabilities as compared to their youth. Further, elderly people tend to be retired, and thus do not spend their time focused on an avocation.

Speech recognition technologies, as described, for example in Gupta, U.S. Pat. No. 6,138,095, incorporated herein by reference, are programmed or trained to recognize the words that a person is saying. Various methods of implementing these speech recognition technologies include either associating the words spoken by a human with a dictionary lookup and error checker or through the use of neural networks which are trained to recognize words.

See also: U.S. Pat. Nos. 7,711,569, 7,711,571, 7,711,560, 7,711,559, 7,707,029, 7,702,512, 7,702,505, 7,698,137, 7,698,136, 7,698,131, 7,693,718, 7,693,717, 7,689,425, 7,689,424, 7,689,415, 7,689,404, 7,684,998, 7,684,983, 7,684,556, 7,680,667, 7,680,666, 7,680,663, 7,680,662, 7,680,661, 7,680,658, 7,680,514, 7,676,363, 7,672,847, 7,672,846, 7,672,841, US Patent App. Nos. 2010/0106505, 2010/0106497, 2010/0100384, 2010/0100378, 2010/0094626, 2010/0088101, 2010/0088098, 2010/0088097, 2010/0088096, 2010/0082343, 2010/0082340, 2010/0076765, 2010/0076764, 2010/0076758, 2010/0076757, 2010/0070274, 2010/0070273, 2010/0063820, 2010/0057462, 2010/0057461, 2010/0057457, 2010/0057451, 2010/0057450, 2010/0049525, 2010/0049521, 2010/0049516, 2010/0040207, 2010/0030560, 2010/0030559, 2010/0030400, 2010/0023332, 2010/0023331, 2010/0023329, 2010/0010814, 2010/0004932, 2010/0004930, 2009/0326941, 2009/0326937, 2009/0306977, 2009/0292538, 2009/0287486, 2009/0287484, 2009/0287483, 2009/0281809, 2009/0281806, 2009/0281804, 2009/0271201, each of which is expressly incorporated herein by reference.

The current scholarly trend is to use statistical modeling to determine whether a sound is a phoneme and whether a certain set of phonemes corresponds to a word. This method is discussed in detail in Turner, Statistical Methods for Natural Sounds (Thesis, University of London, 2010), incorporated herein by reference. Other scholars have applied Hidden Markov Models (HMM) to speech recognitions. Hidden Markov Models are probabilistic models that assume that at any given time, the system is in a state (e.g. uttering the first phoneme). In the next time-step, the system moves to another state with a certain probability (e.g., uttering the second phoneme, completing a word, or completing a sentence). The model keeps track of the current state and attempts to determine the next state in accordance with a set of rules. See, generally, Brown, Decoding HMMs using the k best paths: algorithms and applications, BMC Bioinformatics (2010), incorporated herein by reference, for a more complete discussion of the application of HMMs.

In addition to recognizing the words that a human has spoken, speech recognition software can also be programmed to determine the mood of a speaker, or to determine basic information that is apparent from the speaker's voice, tone, and pronunciation, such as the speaker's gender, approximate age, accent, and language. See, for example, Bohacek, U.S. Pat. No. 6,411,687, incorporated herein by reference, describing an implementation of these technologies. See also, Leeper, Speech Fluency, Effect of Age, Gender and Context, International Journal of Phoniatrics, Speech Therapy and Communication Pathology (1995), incorporated herein by reference, discussing the relationship between the age of the speaker, the gender of the speaker, and the context of the speech, in the fluency and word choice of the speaker. In a similar field of endeavor, Taylor, U.S. Pat. No. 6,853,971, teaches an application of speech recognition technology to determine the speaker's accent or dialect. See also: US App. 2007/0198261, US App. 2003/0110038, and U.S. Pat. No. 6,442,519, all incorporated herein by reference.

In addition, a computer with a camera attached thereto can be programmed to recognize facial expressions and facial gestures in order to ascertain the mood of a human. See, for example, Black, U.S. Pat. No. 5,774,591, incorporated herein by reference. One implementation of Black's technique is by comparing facial images with a library of known facial images that represent certain moods or emotions. An alternative implementation would ascertain the facial expression through neural networks trained to do so. Similarly, Kodachi, U.S. Pat. No. 6,659,857, incorporated herein by reference, teaches about the use of a "facial expression determination table" in a gaming situation so that a user's emotions can be determined. See also U.S. Pat. Nos. 6,088,040, 7,624,076, 7,003,139, 6,681,032, and US App. 2008/0101660.

Takeuchi, "Communicative Facial Displays as a New Conversational Modality," (1993) incorporated herein by reference, notes that facial expressions themselves could be communicative. Takeuchi's study compared a group of people who heard a voice only and a group of people who viewed a face saying the same words as the voice. The people who saw the face had a better understanding of the message, suggesting a communicative element in human facial expressions. Catrambone, "Anthropomorphic Agents as a User Interface Paradigm: Exponential Findings and a Framework for Research," incorporated herein by reference, similarly, notes that users who learn computing with a human face on the computer screen guiding them through the process feel more comfortable with the machines as a result.

Lester goes even further, noting that "animated pedagogical agents" can be used to show a face to students as a complex task is demonstrated on a video or computer screen. The computer (through the face and the speaker) can interact with the students through a dialog. Lester, "Animated Pedagogical Agents: Face-to-Face Interaction in Interactive Learning Environments," North Carolina State University (1999), incorporated herein by reference. Cassell, similarly, teaches about conversational agents. Cassell's "embodied conversational agents" (ECAs) are computer interfaces that are represented by human or animal bodies and are lifelike or believable in their interaction with the human user. Cassell requires ECAs to have the following features: the ability to recognize and respond to verbal and nonverbal input; the ability to generate verbal and nonverbal output; the ability to deal with conversational functions such as turn taking, feedback, and repair mechanisms; and the ability to give signals that indicate the state of the conversation, as well as to contribute new propositions to the discourse. Cassell, "Conversation as a System Framework: Designing Embodied Conversational Agents," incorporated herein by reference.

Massaro continues the work on conversation theory by developing Baldi, a computer animated talking head. When speaking, Baldi imitates the intonations and facial expressions of humans. Baldi has been used in language tutoring for children with hearing loss. Massaro, "Developing and Evaluating Conversational Agents," Perpetual Science Laboratory, University of California. In later developments, Baldi was also given a body so as to allow for communicative gesturing and was taught to speak multiple languages. Massaro, "A Multilingual Embodied Conversational Agent," University of California, Santa Cruz (2005), incorporated herein by reference.

Bickmore continues Cassell's work on embodied conversational agents. Bickmore finds that, in ECAs, the nonverbal channel is crucial for social dialogue because it is used to provide social cues, such as attentiveness, positive affect, and liking and attraction. Facial expressions also mark shifts into and out of social activities. Also, there are many gestures, e.g., waving one's hand to hail a taxi, crossing one's arms and shaking one's head to say "No," etc. that are essentially communicative in nature and could serve as substitutes for words.

Bickmore further developed a computerized real estate agent, Rea, where, "Rea has a fully articulated graphical body, can sense the user passively through cameras and audio input, and is capable of speech with intonation, facial display, and gestural output. The system currently consists of a large projection screen on which Rea is displayed and which the user stands in front of. Two cameras mounted on top of the projection screen track the user's head and hand positions in space. Users wear a microphone for capturing speech input." Bickmore & Cassell, "Social Dialogue with Embodied Conversational Agents," incorporated herein by reference.

Similar to the work of Bickmore and Cassell, Beskow at the Royal Institute of Technology in Stockholm, Sweden created Olga, a conversational agent with gestures that is able to engage in conversations with users, interpret gestures, and make its own gestures. Beskow, "Olga—A Conversational Agent with Gestures," Royal Institute of Technology, incorporated herein by reference.

In "Social Cues in Animated Conversational Agents," Louwerse et al. note that people who interact with ECAs tend to react to them just as they do to real people. People tend to follow traditional social rules and to express their personality in usual ways in conversations with computer-based agents. Louwerse, M. M., Graesser, A. C., Lu, S., & Mitchell, H. H. (2005). Social cues in animated conversational agents. Applied Cognitive Psychology, 19, 1-12, incorporated herein by reference.

In another paper, Beskow further teaches how to model the dynamics of articulation for a parameterized talking head based on the phonetic input. Beskow creates four models of articulation (and the corresponding facial movements). To achieve this result, Beskow makes use of neural networks. Beskow further notes several uses of "talking heads." These include virtual language tutors, embodied conversational agents in spoken dialogue systems, and talking computer game characters. In the computer game area, proper visual speech movements are essential for the realism of the characters. (This factor also causes "dubbed" foreign films to appear unrealistic.) Beskow, "Trainable Articulatory Control Models for Visual Speech Synthesis" (2004), incorporated herein by reference.

Ezzat goes even further, presenting a technique where a human subject is recorded uttering a predetermined speech corpus by a video camera. A visual speech model is created from this recording. Now, the computer can allow the person to make novel utterances and show how she would move her head while doing so. Ezzat creates a "multidimensional morpheme model" to synthesize new, previously unseen mouth configurations from a small set of mouth image prototypes.

In a similar field of endeavor, Picard proposes computer that can respond to user's emotions. Picard's ECAs can be used as an experimental emotional aid, as a pre-emptive tool to avert user frustration, and as an emotional skill-building mirror.

In the context of a customer call center, Bushey, U.S. Pat. No. 7,224,790, incorporated herein by reference, discusses conducting a "verbal style analysis" to determine a customer's level of frustration and the customer's goals in calling customer service. The "verbal style analysis" takes into account the number of words that the customer uses and the method of contact. Based in part on the verbal style analysis, customers are segregated into behavioral groups, and each behavioral group is treated differently by the customer service representatives. Gong, US App. 2003/0187660, incorporated herein by reference, goes further than Bushey, teaching an "intelligent social agent" that receives a plurality of physiological data and forms a hypothesis regarding the "affective state of the user" based on this data. Gong also analyzes vocal and verbal content and integrates the analysis to ascertain the user's physiological state.

Mood can be determined by various biometrics. For example, the tone of a voice or music is suggestive of the mood. See, Liu et al., Automatic Mood Detection from Acoustic Music Data, Johns Hopkins University Scholarship Library (2003). The mood can also be ascertained based on a person's statements. For example, if a person says, "I am angry," then the person is most likely telling the truth. See Kent et al., Detection of Major and Minor Depression in Children and Adolescents, Journal of Child Psychology (2006). One's facial expression is another strong indicator of one's mood. See, e.g., Cloud, How to Lift Your Mood? Try Smiling. Time Magazine (Jan. 16, 2009).

Therefore, it is feasible for a human user to convey his mood to a machine with an audio and a visual input by speaking to the machine, thereby allowing the machine to read his voice tone and words, and by looking at the machine, thereby allowing the machine to read his facial expressions.

It is also possible to change a person's mood through a conversational interface. For example, when people around one are smiling and laughing, one is more likely to forget one's worries and to smile and laugh oneself. In order to change a person's mood through a conversational interface, the machine implementing the interface must first determine the starting mood of the user. The machine would then go through a series of "optimal transitions" seeking to change the mood of the user. This might not be a direct transition. Various theories discuss how a person's mood might be changed by people or other external influences. For example, Neumann, "Mood Contagion": The Automatic Transfer of Mood Between persons, Journal of Personality and Social Psychology (2000), suggests that if people around one are openly experiencing a certain mood, one is likely to join them in experiencing said mood. Other scholars suggest that logical mood mediation might be used to persuade someone to be happy. See, e.g., DeLongis, The Impact of Daily Stress on Health and Mood: Psychological and Social Resources as Mediators, Journal of Personality and Social Psychology (1988). Schwarz notes that mood can be impacted by presenting stimuli that were previously associated with certain moods, e.g., the presentation of chocolate makes one happy because one was previously happy when one had chocolate. Schwarz, Mood and Persuasion: Affective States Influence the Processing of Persuasive Communications, in Advances in Experimental Social Psychology, Vol. 24 (Academic Press 1991). Time Magazine suggests that one can improve one's mood merely by smiling or changing one's facial expression to imitate the mood one wants to experience. Cloud, How to Lift Your Mood? Try Smiling. Time Magazine (Jan. 16, 2009).

Liquid crystal display (LCD) screens are known in the art as well. An LCD screen is a thin, flat electronic visual display that uses the light modulating properties of liquid crystals. These are used in cell phones, smartphones, laptops, desktops, and televisions. See Huang, U.S. Pat. No. 6,437,975, incorporated herein by reference, for a detailed discussion of LCD screen technology.

Many other displays are known in the art. For example, three-dimensional televisions and monitors are available from Samsung Corp. and Philips Corp. One embodiment of the operation of three-dimensional television, described by Imsand in U.S. Pat. No. 4,723,159, involves taking two cameras and applying mathematical transforms to combine the two received images of an object into a single image, which can be displayed to a viewer. On its website, Samsung notes that it's three-dimensional televisions operate by "display[ing] two separate but overlapping images of the same scene simultaneously, and at slightly different angles as well." One of the images is intended to be perceived by the viewer's left eye. The other is intended to be perceived by the right eye. The human brain should convert the combination of the views into a three-dimensional image. See, generally, Samsung 3D Learning Resource, www.samsung-.com/us/learningresources3D (last accessed May 10, 2010).

Projectors are also known in the art. These devices project an image from one screen to another. Thus, for example, a small image on a cellular phone screen that is difficult for an elderly person to perceive may be displayed as a larger image on a wall by connecting the cell phone with a projector. Similarly, a netbook with a small screen may be connected by a cable to a large plasma television or plasma screen. This would allow the images from the netbook to be displayed on the plasma display device.

Devices for forming alternative facial expressions are known in the art. There are many children's toys and pictures with changeable facial expressions. For example, Freynet, U.S. Pat. No. 6,146,721, incorporated herein by reference, teaches a toy having alternative facial expression. An image of a face stored on a computer can be similarly presented on an LCD screen with a modified facial expression. See also U.S. Pat. Nos. 5,215,493, 5,902,169, 3,494,068, and 6,758,717, expressly incorporated herein by reference.

In addition, emergency detection systems taking input from cameras and microphones are known in the art. These systems are programmed to detect whether an emergency is ongoing and to immediately notify the relevant parties (e.g., police, ambulance, hospital or nursing home staff, etc.). One such emergency detection system is described by Lee, U.S. Pat. No. 6,456,695, expressly incorporated herein by reference. Lee suggests that an emergency call could be made when an emergency is detected, but does not explain how an automatic emergency detection would take place. However, Kirkor, U.S. Pat. No. 4,319,229, proposes a fire emergency detector comprising "three separate and diverse sensors . . . a heat detector, a smoke detector, and an infrared radiation detector." Under Kirkor's invention, when a fire emergency is detected, (through the combination of inputs to the sensors) alarm is sounded to alert individuals in the building and the local fire department is notified via PSTN. In addition, some modern devices, for example, the Emfit Movement Monitor/Nighttime Motion Detection System, www.gosouthernmd.com/store/store/comersus_viewItem.asp?idProduct=35511, last accessed May 10, 2010, comprise a camera and a pressure sensor adapted to watch a sleeping person and to alert a caregiver when the sleeping patient is exhibiting unusual movements.

See, also (each of which is expressly incorporated herein by reference):

André, Elisabeth, Thomas Rist, and Jochen Muller. "Employing AI methods to control the behavior of animated interface agents." Applied artificial intelligence 13, no. 4-5 (1999): 415-448.

Andre, et al., "The Automated Design of Believable Dialogues for Animated Presentation Teams"; in J. Cassell, S. Prevost, J. Sullivan, and E. Churchill: Embodied Conversational Agents, The MIT Press, pp. 220-255, 2000.

Aravamuden, U.S. Pat. No. 7,539,676, expressly incorporated herein by reference, teaches about presenting content to a user based on how relevant it is believed to be for a user based on the text query that the user entered and how the user responded to prior search results.

Atmmarketplace.com (2003) "New bank to bring back old ATM character," News Article, 7th April 2003

Barrow, K (2000) "What's anthropomorphism got to with artificial intelligence? An investigation into the extent of anthropomorphism within the field of science". Unpublished student dissertation, University of the West of England Beale, et al., "Agent-Based Interaction," in People and Computers IX: Proceedings of HCI'94, Glasgow, UK, August 1994, pp. 239-245.

Becker, Christian, Stefan Kopp, and Ipke Wachsmuth. "Simulating the emotion dynamics of a multimodal conversational agent." In tutorial and research workshop on affective dialogue systems, pp. 154-165. Springer, Berlin, Heidelberg, 2004.
Bentahar, Jamal, Bernard Moulin, and Brahim Chaib-draa. "Towards a formal framework for conversational agents." In Proceedings of Agent Communication Languages and Conversation Policies AAMAS 2003 Workshop. 2003.
Beskow, Jonas. "Trainable articulatory control models for visual speech synthesis." International Journal of Speech Technology 7, no. 4 (2004): 335-349.
Beskow, et al., "Olga-a Conversational Agent with Gestures," In André, E. (Ed.), Proc of the IJCAI-97 Workshop on Animated Interface Agents: Making them Intelligent (pp. 39-44). Nagoya, Japan.
Beun, et al., "Embodied Conversational Agents: Effects on Memory Performance and Anthropomorphisation"; T. Rist et al. (Eds.): IVA 2003, LNAI 2792, pp. 315-319, 2003
Bickmore, Timothy W., and Rosalind W. Picard. "Establishing and maintaining long-term human-computer relationships." ACM Transactions on Computer-Human Interaction (TOCHI) 12, no. 2 (2005): 293-327.
Bickmore, Timothy, and Justine Cassell. "Relational agents: a model and implementation of building user trust." In Proceedings of the SIGCHI conference on Human factors in computing systems, pp. 396-403. 2001.
Bickmore, et al., "Social Dialogue with Embodied Conversational Agents"; T.H.E. Editor(s) (ed.), Book title, 1-6, pages 1-27.
Biever, C (2004) "Polite computers win users' hearts and minds" News article, 17th July 2004, New Scientist
Brennan, S E & Ohaeri, J O (1994) "Effects of message style on users' attributions toward agents." Proceedings of the ACM CHI '94 Human Factors in Computing Systems: Conference Companion, Boston, 24th-28th April 1994, 281-282.
Brennan, S E, Laurel, B, & Shneiderman, B (1992) "Anthropomorphism: from ELIZA to Terminator 2. Striking a balance", Proceedings of the 1992 ACM/SIGCHI Conference on Human Factors in Computing Systems, New York: ACM Press, 67-70.
Cassell, Justine. "Embodied conversational agents: representation and intelligence in user interfaces." AI magazine 22, no. 4 (2001): 67-67.
Cassell, et al., "Animated Conversation: Rule-based Generation of Facial Expression, Gesture & Spoken Intonation for Multiple Conversational Agents", Computer Graphics (1994), Volume: 28, Issue: Annual Conference Series, Publisher: ACM Press, Pages: 413-420.
Cassell, Justine, Tim Bickmore, Lee Campbell, Hannes Vilhjalmsson, and Hao Yan. "Human conversation as a system framework: Designing embodied conversational agents." Embodied conversational agents (2000): 29-63.
Cassell, et al., "Negotiated Collusion: Modeling Social Language and its Relationship Effects in Intelligent Agents"; User Modeling and User-Adapted Interaction 13: 89-132, 2003.
Catrambone, Richard, John Stasko, and Jun Xiao. "Anthropomorphic agents as a user interface paradigm: Experimental findings and a framework for research." In Proceedings of the Annual Meeting of the Cognitive Science Society, vol. 24, no. 24. 2002.
Cole, Ron, Tim Carmell, Pam Connors, Mike Macon, Johan Wouters, Jacques de Villiers, Alice Tarachow et al. "Intelligent animated agents for interactive language training." ACM SIGCAPH Computers and the Physically Handicapped 61 (1998): 5-10.
Dawson, Christian, W (2000) The Essence of Computing Projects: A Student's Guide, Prentice Hall.
De Laere, K, Lundgren, D & Howe, S (1998) "The Electronic Mirror: Human-Computer Interaction and Change in Self-Appraisals" Computers in Human Behavior, 14 (1) 43-59.
Dix, A, Finlay, J, Abowd, G & Beale, R (2002) Human-Computer Interaction, Second Edition, Pearson Education, Harlow, Essex.
Egges, Arjan, Sumedha Kshirsagar, and Nadia Magnenat-Thalmann. "Generic personality and emotion simulation for conversational agents." Computer animation and virtual worlds 15, no. 1 (2004): 1-13.
Ezzat, Tony, Gadi Geiger, and Tomaso Poggio. "Trainable videorealistic speech animation." ACM Transactions on Graphics (TOG) 21, no. 3 (2002): 388-398.
Flind, Allison, (2006) "Is Anthropomorphic Design a Viable Way of Enhancing Interface Usability?", B. Sc. Thesis Apr. 14, 2005, University of West England, Bristol, www.anthropomorphism.co.uk/index.html, ww.anthropomorphism.co.uk/anthropomorphism.pdf
Fogg, B J & Nass, C (1997) "Silicon sycophants: the effects of computers that flatter," International Journal of Human-Computer Studies 46 551-561.
Forbes (Apr. 20, 1998) "Banks that chat and other irrelevancies" Interview with Ben Shneiderman, www.forbes.com/forbes/1998/0420/6108224a.html.
Gates, B. (1995) "Bill's speech at Lakeside High-School 1995."
Grosz, "Attention, Intentions, and the Structure of Discourse," Computational Linguistics, Volume 12, Number 3, July-September 1986, pp. 175-204.
Guthrie, S (1993) Faces in the clouds—a new theory of religion, Oxford U. Press, NY.
Harper, W, M (1965) Statistics, Unwin, London.
Harris, B (1996) "No stamps in cyberspace" News article, August 1996, govtech.net.
Hartmann, Bjorn, Maurizio Mancini, and Catherine Pelachaud. "Implementing expressive gesture synthesis for embodied conversational agents." In International Gesture Workshop, pp. 188-199. Springer, Berlin, Heidelberg, 2005.
Hasegawa, Osamu, and Katsuhiko Sakaue. "Cg tool for constructing anthropomorphic interface agents." In Proc. IJCAI-97 WS (W5), Animated Interface Agents, pp. 23-26. 1997.
Henderson, M, E, Lyons Morris, L, Taylor Fitz-Gibbon, C (1987) How to Measure Attitudes, 2nd Edition, Sage Publications.
Heylen, et al., "Experimenting with the Gaze of a Conversational Agent."
Hodgkinson, T (1993) "Radical mushroom reality," An interview with author Terence McKenna, Fortean Times Magazine, 71, October/November 1993.
Horvitz, E (2005) "Lumiére Project: Bayesian Reasoning for Automated Assistance," research.microsoft.com/~horvitz/lum.htm).
Horvitz, E, Breese, J, Heckerman, D, Hovel, D & Rommelse, K (1998) "The Lumiére project: Bayesian user modeling for inferring the goals and needs of software users", Proceedings of the Fourteenth Conference on Uncertainty in Artificial Intelligence, Madison, Wis., 256-265, Morgan Kaufmann, San Francisco. research-.microsoft.com/-horvitz/lumiere.htm.

Isbister, K & Nass, C (2000). "Consistency of personality in interactive characters: verbal cues, non-verbal cues, and user characteristics." International Journal of Human-Computer Studies, 53 (1), 251-267.

Johnson, et al., "Animated Pedagogical Agents: Face-to-Face Interaction in Interactive Learning Environments." International Journal of Artificial Intelligence in Education, 2000.

Ju, W, Nickell, S, Eng & Nass, C (2005) "Influence of colearner behavior on learner performance and attitudes" Proceedings of the CHI Conference on Human Factors in Computing Systems 2005, Portland, Oreg.

Lanier, J (1995) "Agents of alienation", Journal of Consciousness Studies, 2 (1), 76-81.

Laurel, B (1992) "In defense of anthropomorphism," speech delivered at the ACM SIGCHI 92, published on Laurel's website, www.tauzero.com/Brenda_Laurel/Severed_Heads/DefenseOfAnthropomorphism.html Lester, James C., Sharolyn A. Converse, Susan E. Kahler, S. Todd Barlow, Brian A. Stone, and Ravinder S. Bhogal. "The persona effect: affective impact of animated pedagogical agents." In Proceedings of the ACM SIGCHI Conference on Human factors in computing systems, pp. 359-366. 1997.

Louwerse, et al., "Social Cues in Animated Conversational Agents"; Applied Cognitive Psychology, 19, 1-12.

Luck, Martin (1999) Your Student Research Project, Gower.

Markoff, J (2000). "Microsoft sees software "agent" as way to avoid distractions." New York Times, Technology Section.

Massaro, et al., "A Multilingual Embodied Conversational Agent." Proceedings of the 38th Hawaii International Conference on System Sciences—2005, pp. 1-8.

Massaro, et al., "Developing and Evaluating Conversational Agents"; Paper for First Workshop on Embodied Conversational Characters (WECC) Granlibakken Resort & Conference Center, November 1998, Lake Tahoe.

Mc Breen, et al., "Evaluating Humanoid Synthetic Agents in E-Retail Applications"; IEEE Transactions on Systems, Man and Cybernetics-Part A: Systems and Humans, Vol. 31, No. 5, September 2001, pp. 394-405.

McNeil, Patrick (1990) Research Methods, 2nd Edition, Routledge.

Morkes, J, Kemal, H & Nass, C "Humour in Computer-Mediated Communication and Human-Computer Interaction". Proceedings of the ACM CHI '98, Los Angeles, CA, p. 215-216.

Morris, "Conversational Agents for Game-Like Virtual Environments"; American Association for Artificial Intelligence, pp. 82-86.

Nass, C & Moon, Y (2000) "Machines and mindlessness: social responses to computers," Journal of social issues, 56 (1) 81-103

Nass, C (1998). Are computers scapegoats? Attributions of responsibility in human-computer interaction. International Journal of Human-Computer Studies, 49 (1), 79-94.

Nass, C, Moon, Y, Fogg, B J, Reeves, B, & Dryer, C (1995). "Can computer personalities be human personalities?" International Journal of Human-Computer Studies, 43, 223-239.

Nass, C, Steuer, J & Tauber, E (1994) "Computers are social actors". Proceeding of the CHI Conference, 72-77. Boston, MA.

Nass, C, Steuer, J S, Henriksen, L, & Dryer, C (1994) "Machines and social attributions: Performance assessments of computers subsequent to "self-" or "other-" evaluations," International Journal of Human-Computer Studies, 40, 543-559.

Nass, Clifford, Katherine Isbister, and Eun-Ju Lee. "Truth is beauty: researching embodied conversational agents." In Embodied conversational agents, pp. 374-402. 2001.

New Scientist Archive (2004) "Strictly non-PC," News article about Microsoft's cultural insensitivity (22nd November 2004).

Office Assistant Demonstration (1996) "From Office 97 Comdex Roll Out."

Picard, "Affective Computing"; M.I.T. Media Laboratory Perceptual Computing Section Technical Report No. 321, pp. 1-16.

Picard, et al., "Computers that Recognise and Respond to User Emotion: Theoretical and Practical Implications," MIT Media Lab Tech Report 538, Interacting with Computers (2001).

Preece, J, Rogers, Y, Sharp, H, Benyon, D, Holland, S, Carey, T (1994) Human-Computer Interaction, Addison-Wesley.

Reeves, Byron, and Clifford Nass. "The media equation: How people treat computers, television, and new media like real people." Cambridge, UK 10 (1996): 236605.

Resnik, P V & Lammers, H B (1986) "The influence of self-esteem on cognitive Responses to machine-like versus human-like computer feedback," The Journal of Social Psychology, 125 (6), 761-769.

Rickenberg, R & Reeves, B (2000) The effects of animated characters on anxiety, task performance, and evaluations of user interfaces. Proceedings of CHI 2000—Conference on Human Factors in Computing Systems. New York, NY, 49-56.

Roy, US App. 2009/0063147, expressly incorporated herein by reference, teaches about phonetic, syntactic and conceptual analysis drive speech recognition.

Schneider, David I (1999) Essentials of Visual Basic 6.0 programming Prentice-Hall, NJ.

See also, each of which is expressly incorporated herein by reference:

Shneiderman, B & Plaisant, C (2004) Designing the User Interface: Strategies for Effective Human-Computer Interaction Fourth Edition, Pearson Addison Wesley, London.

Shneiderman, B (1992) Designing the User Interface: Strategies for Effective Human-Computer Interaction Second Edition, Addison Wesley Longman, London.

Swartz, L (2003) "Why people hate the paperclip: labels, appearance, Behaviour and social responses to user interface agents," Student thesis, symbolic systems program, Stanford University, xenon.stanford.edu/-lswartz/paperclip/.

Takeuchi, Akikazu, and Katashi Nagao. "Communicative facial displays as a new conversational modality." In Proceedings of the INTERACT'93 and CHI'93 Conference on Human Factors in Computing Systems, pp. 187-193. 1993.

Technovelgy.com (2005) "Mac Mini and KITT the Knight Rider" News article about the Mac Mini, 13th January 2005, www.technovelgy.com/ct/Science-Fiction-News.asp?NewsNum=311.

Toastytech.com (2005) "Microsoft Bob Version 1.00", Summary of Microsoft Bob, toastytech.com/guis/bob.html (10th January 2005).

Tzeng, J-Y, (2004) "Towards a more civilised design, studying the effects of computers that apologise," International Journal of Human-Computer Studies, 61 319-345.
Vertegaal, et al., "Why Conversational Agents Should Catch the Eye", CHI 2000, 1-6 Apr. 2000, pp. 257-258.
Wetmore, J (1999) "Moving relationships: befriending the automobile to relieve anxiety" www.drdriving.org/misc/anthropomorph.html.

SUMMARY OF THE INVENTION

The present system and method provide a conversational interactive interface for an electronic system, which communicates using traditional human communication paradigms, and employs artificial intelligence to respond to the user. Many of technologies employed by components of the system and method are available. For example, by combining the technologies of, Gupta U.S. Pat. No. 6,138,095 (word recognizer), Bohacek U.S. Pat. No. 6,411,687 (mood detector based on speech), Black U.S. Pat. No. 5,774,591 (facial expression to mood converter), and Bushey U.S. Pat. No. 7,224,790 (analysis of word use to detect the attitude of the customer), the mood of a user of a computer with a camera and a microphone who is looking into the camera and speaking into the microphone can effectively be ascertained.

Conversation is a progression of exchanges (usually oral, but occasionally written) by participants. Each participant is a "learning system," that is, a system that is adaptive and changes internally as a consequence of experience. This highly complex type of interaction is also quite powerful, for conversation is the means by which existing knowledge is conveyed, and new knowledge is generated. Conversation is different from other interactions, such as a mechanical response (e.g. door that opens when one presses a button or an Internet search query that returns a pre-determinable set of results) because conversation is not a simple reactive system. It is a uniquely personal interaction to the degree that any output response must be based on the input prior statement, as well as other information about one's dealings with the other party to the conversation and former conversation. It often involves synthesis of ideas with new information or preexisting information not previously expressed for the purpose at hand, and can also involve a form of debate, where a party adopts a position or hypothesis that it does not hold firmly, in order to continue the interaction. As a result, the thesis or topic can itself evolve, since the conversation need not be purposeful. Indeed, for social conversation, the process is not intended to resolve or convince, but rather to entertain. One would normally converse very differently with one's spouse, one's child, one's social friend, and one's business colleague, thus making conversation dependent on the counterparty. See, generally, Gordon Pask, Conversation Theory, Applications in Education and Epistemology, Elsevier, 1976; Gordon Pask, Heinz von Foerster's Self-Organisation, the Progenitor of Conversation and Interaction Theories, 1996. We say that an output response is "conversationally relevant" to an input prior statement and course of dealings if the output builds on the input, and does more than merely repeats the information that can be found in the prior course of dealings. Often, the evolution of a conversation incorporates "new" facts, such as current events or changes from a prior conversation.

In spite of a large amount of technology created for the care of elderly people, a problem which many elderly people experience is loneliness. Many elderly individuals live alone or in nursing homes and do not have as much company as they would like due to the fact that many of their friends and families are far away, unavailable, sick or deceased. In addition, a large percentage of elderly people do not drive and have difficulty walking, making it difficult for them to transport themselves to visit their friends. Social and business networking websites, such as Facebook and LinkedIn, which are popular among younger generations, are not as popular with elderly people, creating a need in the elderly community for updates regarding their friends and families. One particular issue is a generation gap in technological proficiency, and comfort level with new types of man-machine interfaces. For example, older generations are more comfortable using a telephone than a computer for communications, and may also prefer "face to face" conversation to voice only paradigms.

The present invention provides, according to one aspect, an automated device that allows humans, and especially elderly people, to engage in conversational interactions, when they are alone. Such automated devices may provide users with entertainment and relevant information about the world around them. Also, preferably, this device would contribute to the safety of the elderly people by using the camera and microphone to monitor the surroundings for emergency situations, and notify the appropriate people if an emergency takes place.

A preferred embodiment of the invention provides a personal interface device. The personal interface device is, for example, particularly adapted for use by an elderly or lonely person in need of social interaction.

In a first embodiment, the personal interface device has a microphone adapted to receive audio input, and a camera adapted to receive image input. Persons having ordinary skill in the art will recognize many such devices that have a microphone and a camera and could be used to implement this invention. For example, the invention could be implemented on a cell phone, a smartphone, such as a Blackberry or Apple iPhone, a PDA, such as an Apple iPad, Apple iPod or Amazon Kindle, a laptop computer, a desktop computer, or a special purpose computing machine designed solely to implement this invention. Preferably, the interface device comprises a single integral housing, such as a cellular telephone, adapted for video conferencing, in which both a video camera and image display face the user.

In a preferred embodiment, the device is responsive to voice commands, for example supporting natural language interaction. This embodiment is preferred because many elderly people have difficulty operating the small buttons on a typical keyboard or cell phone. Thus, the oral interaction features, for both communication and command and control, are helpful.

Embodiments of the invention further comprise at least one processor executing software adapted to determine the mood of the user based on at least one of the audio input and the image input. This mood determination could take into account many factors. In addition to the actual words spoken by the user, the mood might be inferred from the content of the conversation, user's tone, hand gestures, and facial expressions. The mood could be ascertained, for example, through an express input, a rule-based or logical system, through a trainable neural network, or other known means. For example, a user mood may be determined in a system according to an embodiment of the present invention which combines and together analyzes data derived from application of the technologies of Gupta (U.S. Pat. No. 6,138,095), which provides a word recognizer, Bohacek (U.S. Pat. No. 6,411,687), which provides a mood detector based on speech, Black (U.S. Pat. No. 5,774,591), which provides a system and method to ascertain mood based on facial expression, and Bushey (U.S. Pat. No. 7,224,790), which analyzes word use to detect the attitude of the customer.

In one embodiment, in order to have conversations that are interesting to the user, the device is adapted to receive information of interest to the user from at least one database or network, which is typically remote from the device, but may also include a local database and/or cache, and which may also be provided over a wireless or wired network, which may comprise a local area network, a wide area network, the Internet, or some combination. Information that is of interest to the user can also be gathered from many sources. For example, if the user is interested in finance, the device could receive information from Yahoo Finance and the Wall Street Journal. If the user is interested in sports, the device could automatically upload the latest scores and keep track of ongoing games to be able to discuss with the user. Also, many elderly people are interested in their families, but rarely communicate with them. The device might therefore also gather information about the family through social networking websites, such as Facebook and LinkedIn. Optionally, the device might also track newspaper or other news stories about family members. In one embodiment, artificial intelligence techniques may be applied to make sure that the news story is likely to be about the family member and not about someone with the same name. For example, if a grandson recently graduated from law school, it is likely that the grandson passed the local Bar Exam, but unlikely that the grandson committed an armed robbery on the other side of the country. In another embodiment, the device could notify the user when an interesting item of information is received, or indeed raise this as part of the "conversation" which is supported by other aspects of the system and method. Therefore, the device could proactively initiate a conversation with the user under such a circumstance, or respond in a contextually appropriate manner to convey the new information. A preferred embodiment of this feature would ensure that the user was present and available to talk before offering to initiate a conversation. Thus, for example, if there were other people present already engaged in conversation (as determined by the audio information input and/or image information input), an interruption might be both unwarranted and unwelcome.

The gathering of information might be done electronically, by an automatic search, RSS (most commonly expanded as "Really Simple Syndication" but sometimes "Rich Site Summary") feed, or similar technique. The automatic information gathering could take place without a prompt or other action from the user. Alternatively, in one embodiment, the device communicates with a remote entity, (e.g., call center employee) who may be someone other than the user-selected person who is displayed on the screen, that communicates information in response to the requests of the user. In one embodiment, the remote entity is a human being who is responsible for keeping the conversation interesting for the user and for ensuring the truth and veracity of the information being provided. This embodiment is useful because it ensures that a software bug would not report something that is upsetting or hurtful to the user.

In various embodiments, the device has a display. The display may, for example, present an image of a face of a person. The person could be, for example, anyone of whom a photograph or image is available, or even a synthetic person (avatar). It could be a spouse, a relative, or a friend who is living or dead. The image is preferably animated in an anthropomorphically accurate manner, thus producing an anthropomorphic interface. The interface may adopt mannerisms from the person depicted, or the mood and presentation may be completely synthetic.

The device preferably also has at least one speaker. The speaker is adapted to speak in a voice associated with the gender of the person on the display. In one embodiment, the voice could also be associated with the race, age, accent, profession, and background of the person in the display. In one embodiment, if samples of the person's voice and speech are available, the device could be programmed to imitate the voice.

Also, the invention features at least one programmable processor that is programmed with computer executable code, stored in a non-transitory computer-readable medium such as flash memory or magnetic media, which when executed is adapted to respond to the user's oral requests with at least audio output that is conversationally relevant to the audio input. As noted above, the audio output is preferably in the voice of the person whose image appears on the display, and both of these may be user selected. In one embodiment, the processor stores information of interest to the user locally, and is able to respond to the user's queries quickly, even if remote communication is unavailable. For example, a user might ask about a score in the recent Yankees game. Because the device "knows" (from previous conversations) that the user is a Yankees fan, the processor will have already uploaded the information and is able to report it to the user. In another embodiment, the device is connected to a remote system, such as a call center, where the employees look up information in response to user requests. Under this "concierge" embodiment, the device does not need to predict the conversation topics, and the accuracy of the information provided is verified by a human being.

In a preferred embodiment, the processor implementing the invention is further adapted to receive input from the microphone and/or the camera and to process the input to determine the existence of an emergency. The emergency could be detected either based on a rule-based (logical) system or based on a neural network trained by detecting various emergency scenarios. If an emergency is detected, the processor might inform an emergency assistance services center which is contact, for example, through a cellular telephone network (e.g., e911), cellular data network, the Internet, or produce a local audio and/or visual alert. Emergency assistance services may include, for example, police, fire, ambulance, nursing home staff, hospital staff, and/or family members. The device could be further adapted to provide information about the emergency to emergency assistance personnel. For example, the device could store a video recording of events taking place immediately before the accident, and/or communicate live audio and/or video.

Another embodiment of the invention is directed to a machine-implemented method of engaging in a conversation with a user. In the first step, the machine receives audio and visual input from the user. Such input could come from a microphone and camera connected to the machine. Next, the machine determines the mood of the user based on at least one of the audio input and the visual input. To do this, the machine considers features including facial expressions and gestures, hand gestures, voice tone, etc. In the following step, the machine presents to the user a face of a user-selected person or another image, wherein the facial expression of the person depends on, or is responsive to, the user's mood. The person could be anyone of whom a photograph is available, for example, a dead spouse or friend or relative with whom the user wishes that she were speaking. Alternatively, the user-selected person could be a famous individual, such as the President. If the user does not select a person, a default will be provided. The device may develop its own "personality" based on a starting state, and the various interactions with the user.

In a preferred embodiment, the machine receives information of interest to a user from a database or network. For example, if a user is interested in weather, the machine might upload weather data to be able to "discuss" the weather intelligently. If the user is interested in college football, the machine might follow recent games and "learn" about key plays. In one embodiment, the current conversation could also be taken into account in determining the information that is relevant to the machine's data mining.

Finally, the last step involves providing audio output in a voice associated with a gender of the user-selected person, the tone of the voice being dependent on at least the mood of the user, wherein the audio output is conversationally relevant to the audio input from the user.

In an embodiment of the invention where the machine initiates a conversation with the user, the first step is to receive information of interest from at least one database or network, such as the Internet. The next step is to request to initiate a conversation with the user. Optionally, the machine could check that the user is present and available before offering to initiate a conversation. The machine would then receive from the user an audio input (words spoken into a microphone) and visual input (the user would look on the screen and into a camera). The user would then be presented with an image of the person he selected to view on the screen. The facial expression on the person would be dependent on the mood of the user. In one embodiment the machine would either imitate the mood of the user or try to cheer up the user and improve his mood. Finally, the machine would provide audio output in a voice associated with the gender of the user-selected person on the screen. The tone of the voice will be dependent on the mood of the user. The audio output will be conversationally relevant to the audio input from the user.

Persons skilled in the art will recognize many forms of hardware which could implement this invention. For example, a user interface system may be provided by an HP Pavilion dv4t laptop computer, which has a microphone, video camera, display screen, speakers, processor, and wireless local area network communications, with capacity for Bluetooth communication to a headset and wide area networking (cellular data connection), and thus features key elements of various embodiments of the invention in the body of the computer. If the laptop or desktop computer does not have any of these features, an external screen, webcam, microphone, and speakers could be used. Alternatively, aspects of the invention could be implemented on a smartphone, such as the Apple iPhone or a Google/Motorola Android "Droid." However, an inconvenience in these devices is that the camera usually faces away from the user, such that the user cannot simultaneously look at the screen and into the camera. This problem can be remedied by connecting an iPhone 3G with an external camera or screen or by positioning mirrors such that the user can see the screen while the camera is facing a reflection of the user.

Almost any modern operating system can be used to implement this invention. For example, one embodiment can run on Windows 7. Another embodiment can run on Linux. Yet another embodiment can be implemented on Apple Mac Os X. Also, an embodiment can be run as an Apple iPhone App, a Windows Mobile 6.5 or 7.0 App, a RIM Blackberry App, an Android App or a Palm App. The system need not be implemented as a single application, except on systems which limit multitasking, e.g., Apple iPhone, and therefore may be provided as a set of cooperating software modules. The advantage of a modular architecture, especially with an open application programming interface, is that it allows replacement and/or upgrade of different modules without replacing the entire suite of software. Likewise, this permits competition between providers for the best module, operating within a common infrastructure.

Thus, for example, the conversation logic provided to synthesize past communications and external data sources may be designed in different ways. Rather than mandating a single system, this module may be competitively provided from different providers, such as Google, Microsoft, Yahoo!, or other providers with proprietary databases and/or algorithms. Likewise, in some cases, a commercial subsidy may be available from a sponsor or advertiser for display or discussion of its products, presumably within the context of the conversation. Thus, for example, if the subject of "vacation" is raised, the agent within the device might respond by discussing a sponsor's vacation offering. The user might say: "I hate sitting here—I want to go on vacation somewhere fun!". The device, recognizing the word "vacation" in the context of an open-ended declarative, might respond: "early summer is a great time to go to Florida, before the hurricane season. Hilton Hotels are having a timeshare promotion like the one you went on last year. You can invite grandson Jimmy, who did well in school this year." The user may respond: "that's a great idea. How much does it cost? And I don't want to sit in an endless timeshare sales pitch!" The device might then respond: "If you sit in the sales pitch, which is 90 minutes, you get $300 off the hotel rate, plus it keeps you out of the sun midday. Besides, your friend Wendy Montclair owns a timeshare there and wrote goods things about it on her blog. You always liked Wendy." The user might respond: "I don't like her anymore. She's going out with Snidely Whiplash!" The device might then respond, "You're joking. Snidely Whiplash is a cartoon character from Dudley Do-Right. Besides, the timeshare you now own went up in value, and you can sell it at a profit to buy this one." The user might respond, "I bought the last one to be near Harry. He's a good friend." The conversational interface might respond: "I just checked; Harry Lefkowitz passed away last month at age 79. His obituary is in the Times. Would you like me to read it to you?"

As can be seen from this exchange, the conversational interface seeks to synthesize information, some of which can be gathered in real time based on the context of the conversation, and may optionally have commercial motivation. This motivation or biasing is generally not too strong, since that might undermine the conversational value of the device, but the commercial biasing might be used to reduce the acquisition and/or usage costs of the device, and adaptively provide useful information to the user.

In another embodiment, ads and incentives may be brokered in real time by a remote database. That is, there is no predetermined commercial biasing, but after the user interacts with the device to trigger a "search," a commercial response may be provided, perhaps accompanied by "organic" responses, which can then be presented to the user or synthesized into the conversation. For example, the remote system may have "ads" that are specifically generated for this system and are communicated with sophisticated logic and perhaps images or voices. An example of this is a T-Mobile ad presented conversationally by a Catherine Zeta Jones avatar, talking with the user about the service and products, using her voice and likeness. Assuming the user is a fan, this "personalized" communication may be welcomed, in place of the normal images and voices of the interface. Special rules may be provided regarding what information is uploaded from the device to a remote network, in order to preserve privacy, but in general, an ad-hoc persona provided to the device may inherit the knowledge base and user profile database of the system. Indeed, this paradigm may form a new type of "website," in which the information is conveyed conversationally, and not as a set of static or database-driven visual or audio-visual depictions.

Yet another embodiment does not require the use of a laptop or desktop computer. Instead, the user could dial a phone number from a home, office, or cellular phone and turn on television to a prearranged channel. The television would preferably be connected to the cable or telephone company's network, such that the cable or telephone company would know which video output to provide. The telephone would be used to obtain audio input from the user. Note that video input from the user is not provided here.

The software for running this app could be programmed in almost any programming language, such as Java or C++. Microphones, speakers, and video cameras typically have drivers for providing input or output. Also, Skype provides a video calling platform. This technology requires receiving video and audio input from a user. Skype can be modified such that, instead of calling a second user, a user would "call" an avatar implementing the present invention, which would apply the words the user speaks, as well as the audio and video input provided from the user by the Skype software in order to make conversationally relevant responses to the user.

It is therefore an object to provide a method, and system for performing the method comprising: receiving audio-visual information; determining at least one of a topic of interest to a user and a query by a user, dependent on received audio-visual information; presenting an anthropomorphic object through an audio-visual output controlled by at least one automated processor, conveying information of interest to the user, dependent on at least one of the determined topic of interest and the query; and telecommunicating audio-visual information through a telecommunication interface. The anthropomorphic object may have an associated anthropomorphic mood which is selectively varied in dependence on at least one of the audio-visual information input, the topic of interest, and the received information.

The receiving, presenting and telecommunicating may be performed using a self-contained cellular telephone communication device. The system may respond to spoken commands. The system may determine an existence of an emergency condition. The system may automatically telecommunicate information about the emergency condition without required human intervention. The emergency condition may be automatically telecommunicated with a responder selected from one or more of the group consisting of police, fire, and emergency medical. The query or topic of interest may be automatically derived from the audio-visual information input and communicated remotely from the device through the Internet. The system may automatically interact with a social networking website and/or an Internet search engine and/or a call center through the telecommunication interface. The system may respond to the social networking website, Internet search engine, or call center by transmitting audio-visual information. The system may automatically receive at least one unit of information of interest to the user from a resource remote from the device substantially without requiring an express request from the user, and may further proactively interact with the user in response to receiving said at least one unit of information. The anthropomorphic object may be modified to emulate a received image of a person. The audio-visual output may be configured to emulate a voice corresponding to characteristics of the person represented in the received image of the person. The system may present at least one advertisement responsive to at least one of the topic of interest and the query, and financially accounting for at least one of a presentation of the at least one advertisement and a user interaction with the at least one advertisement. The system may generate structured light, and capture three-dimensional information based at least on the generated structured light. The system may capture a user gesture, and control the anthropomorphic object in dependence on the user gesture. The system may automatically generate a user profile generated based on at least prior interaction with the user.

It is a further object to provide a user interface device, and method of use, comprising: an audio-visual information input configured to receive information sufficient to determine at least one of a topic of interest to a user and a query by a user, dependent on received audio-visual information; at least one audio-visual output configured to present an anthropomorphic object controlled by at least one automated processor, conveying information of interest to the user, dependent on at least one of the determined topic of interest and the query; and an audio-visual telecommunication interface. The at least one automated processor may control the anthropomorphic object to have an associated anthropomorphic mood which is selectively varied in dependence on at least one of the audio-visual information input, the topic of interest, and the received information.

The audio-visual information input and audio-visual output may be implemented on a self-contained cellular telephone communication device. The at least one automated processor may be configured to respond to spoken commands, and to process the received information and to determine an emergency condition. The at least one processor may be configured to automatically telecommunicate information about the determined emergency condition without required human intervention. The determined emergency condition may be automatically telecommunicated with a responder selected from one or more of the group consisting police, fire, and emergency medical. The system may automatically interact with a social networking website based on at least an implicit user command may be provided. The system may be configured to automatically interact with a call center, and to automatically respond to the call center to transmit audio-visual information may be provided. The at least one processor may be configured to automatically receive at least one unit of information of interest to the user from a resource remote from the device substantially without requiring an express request from the user and to initiate an interaction with the user in response to receiving said at least one unit of information. The anthropomorphic object may be configured to represent a received image of a person and to provide an audio output in a voice corresponding to a characteristic of the received image of the person. The at least one processor may be configured to present at least one advertisement responsive to at least one of the topic of interest and the query and to permit the user to interact with the advertisement. The audio-visual information input may comprise a structured light image capture device. The at least one processor may be configured to automatically generate a user profile generated based on the at least prior interaction of the user. The mood may correspond to a human emotional state, and the at least one processor may be configured to determine a user emotional state based on at least the audio-visual information.

It is a further object to provide a method comprising: defining an automated interactive interface having an anthropomorphic personality characteristic, for semantically interacting with a human user to receive user input and present information in a conversational style; determining at least one of a topic of interest to a user dependent on the received user input; automatically generating a query seeking information corresponding to the topic of interest from a database; receiving information of interest to the user from the database, comprising at least a set of facts or information; and providing at least a portion of the received facts or information to the user through the automated interactive interface, in accordance with the conversational style, responsive to the received user input, and the information of interest. The conversational style may be defined by a set of conversational logic comprising at least a persistent portion and an information of interest responsive portion. The anthropomorphic personality characteristic may comprise an automatically controlled human emotional state, the human emotional state being controlled responsive to at least the received user input. Telecommunications with the database may be conducted through a wireless network interface.

It is another object to provide a user interface system comprising an interactive interface; and at least one automated processor configured to control the interactive interface to provide an anthropomorphic personality characteristic, configured to semantically interact with a human user to receive user input and present information in a conversational style; determine at least one of a topic of interest to a user dependent on the received user input; automatically generate a query seeking information corresponding to the topic of interest from a database; receive information of interest to the user from the database, comprising at least a set of facts or information; and provide at least a portion of the received facts or information to the user through the interactive interface, in accordance with the conversational style, responsive to the received user input, and the information of interest. The conversational style may be defined by a set of conversational logic comprising at least a persistent portion and an information of interest responsive portion. The anthropomorphic personality characteristic may comprise a human emotional state, the human emotional state being controlled responsive to at least the received user input. A wireless network interface telecommunications port may be provided, configured to communicate with the database.

Another object provides a method comprising: defining an automated interactive interface having an artificial intelligence-based anthropomorphic personality, configured to semantically interact with a human user through an audio-visual interface, to receive user input and present information in a conversational style; determining at least one of a topic of interest to a user dependent on at least the received user input and a history of interaction with the user; automatically generating a query seeking information corresponding to the topic of interest from a remote database through a telecommunication port; receiving information of interest to the user from the remote database through the telecommunication port, comprising at least a set of facts or information; and controlling the automated interactive interface to convey the facts or information to the user in the conversation style, subject to user interruption and modification of the topic of interest.

A still further object provides a system, comprising: a user interface, comprising a video output port, an audio output port, a camera, a structured lighting generator, and an audio input port; a telecommunication interface, configured to communicate at least a voice conversation through an Internet interface; and at least one processor, configured to receive user input from the user interface, to generate signals for presentation through the user interface, and to control the telecommunication interface, the at least one processor being responsive to at least one user gesture captured by the camera in conjunction with the structured lighting generator to provide control commands for voice conversation communication.

Another object provides a system and method for presenting information to a user, comprising: generating a data file corresponding to a topic of information, the data file comprising facts and conversational logic; communicating the data file to a conversational processor system, having a human user interface configured to communicate a conversational semantic dialog with a user; processing the data file in conjunction with a past state of the conversational semantic dialog with the conversational processor; outputting through the human user interface a first semantic construct in dependence on at least the data file; receiving, after outputting said first semantic construct, through the human user interface a semantic user input; and outputting, after receiving said semantic user input, through the human user interface, a conversationally appropriate second semantic construct in dependence on at least the data file and said semantic user input. The method may further comprise receiving a second data file comprising at least one additional fact, after said receiving said semantic user input, wherein said conversationally appropriate second semantic construct is generated in dependence on at least the second data file.

These and other objects will become apparent from a review of the preferred embodiments and figures.

DETAILED DESCRIPTION OF THE PREFERRED EMBODIMENTS

Example 1

Cell Phone

Figure 1:
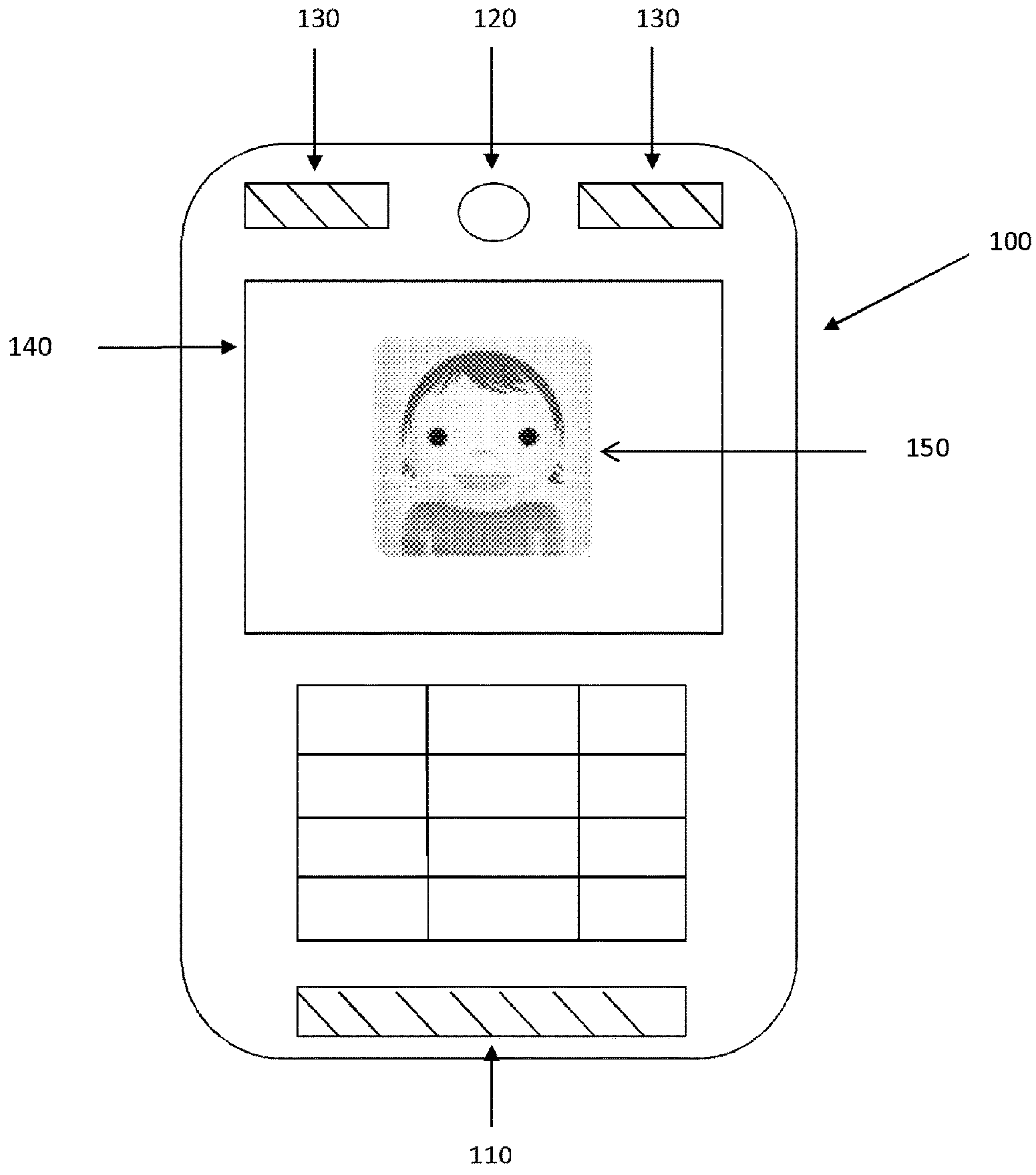
FIG. 1 illustrates an exemplary machine implementing an embodiment of the present invention.

FIG. 1 illustrates an exemplary machine 100 that can be used to implement an embodiment of the present invention. The machine comprises a microphone 110 adapted to receive audio information input and a camera 120 adapted to receive image information input. The camera 120 is preferably facing the user. There are one or more speakers 130 for audio output (e.g., voice reproduction) and a display 140, which also preferably faces the user. There is also a processor (not illustrated in FIG. 1, but an exemplary processor appears in FIG. 4) and the machine is preferably at least sometimes able to connect to the Internet or a remote database server which stores a variety of human-interest information. The image 150 in display 140 is preferably the face of a person who is selected by the user. The face may also be of another species, or completely synthetic. In one embodiment, the lips of image 150 move as image 150 speaks, and image 150's facial expression is determined to convey an anthropomorphic mood, which itself may be responsive to the mood of the user, as signaled by the audio and image input through microphone 110 and camera 120. The mood of the user may be determined from the words spoken by the user, the voice tone of the user, the facial expression and gestures of the user, the hand gestures of the user, etc. The device 100 may be configured as a cellular telephone or so-called smartphone, but persons having ordinary skill in the art will realize that this invention could be implemented in many other form factors and configurations. For example, the device could be run on a cell phone, a smart phone (e.g., Blackberry, Apple iPhone), a PDA (e.g., Apple iPod, Apple iPad, Amazon Kindle), a laptop computer, a desktop computer, or a special purpose computing machine, with relatively minor modifications. The interface may be used for various consumer electronics devices, such as automobiles, televisions, set-top boxes, stereo equipment, kitchen appliances, thermostats and HVAC equipment, laundry appliances, and the like. The interface may be employed in public venues, such as vending machines and ATMs. In some cases, the interface may be an audio-only interface, in which imaging may be unidirectional or absent. In audio-only systems, the interface seeks to conduct an intelligent conversational dialog and may be part of a call center or interactive voice response system. Thus, for example, the technology might be employed to make waiting queues for call centers more interesting and tolerable for users.

Figure 2:
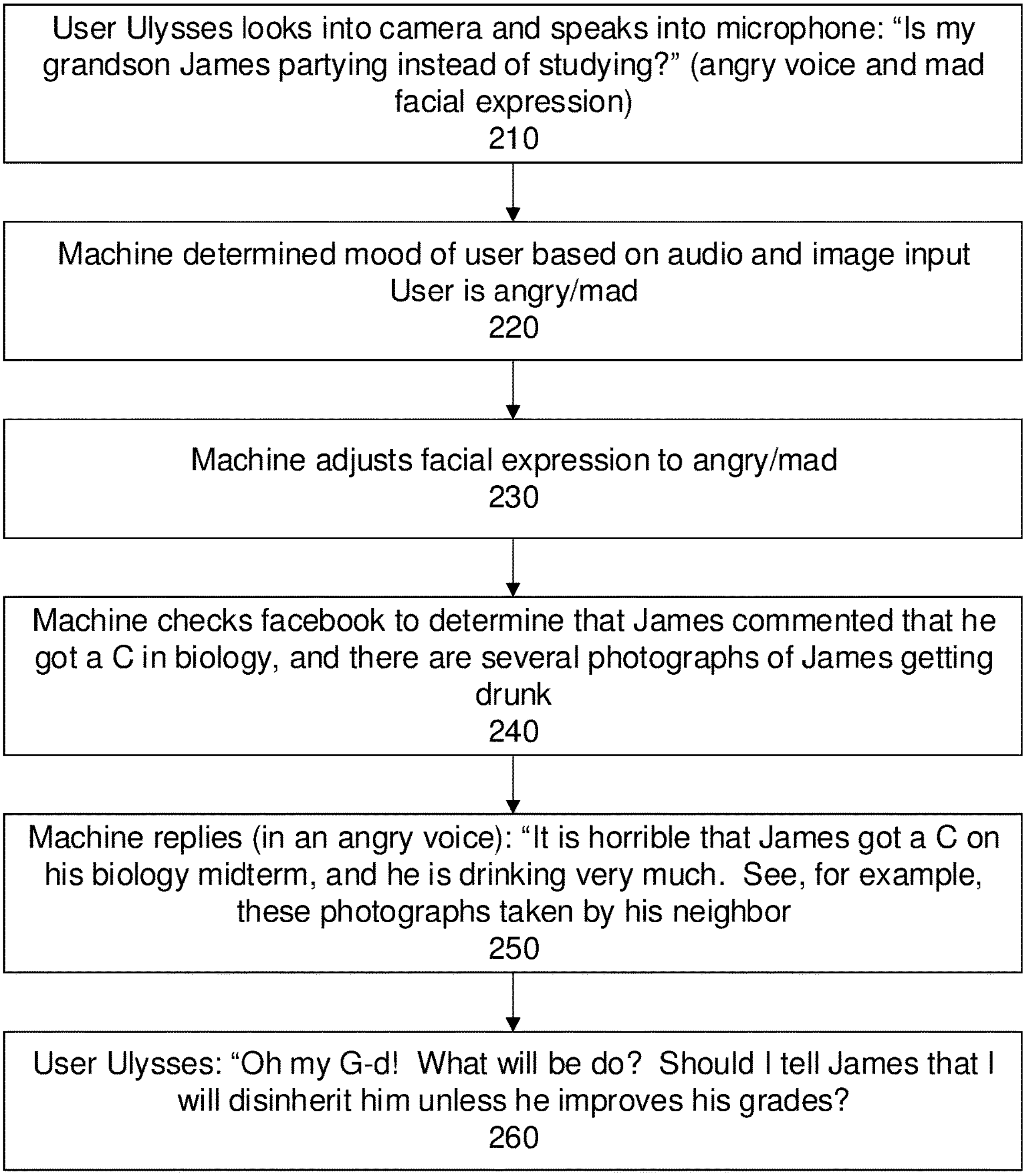
FIG. 2 illustrates a flowchart of a method implementing an embodiment of the present invention.

FIG. 2 is a flowchart 200 illustrating the operation of one embodiment of the invention. In step 210, the user Ulysses looks into the camera and speaks into the microphone. Preferably, the user would naturally be looking into the camera because it is located near the screen where an image of a person is displayed. The person could be anyone whom the user selects, of whom the user can provide a photograph. For example, it might be a deceased friend or spouse, or a friend or relative who lives far away and visits rarely. Alternatively, the image might be of a famous person. In the example, the image in the machine (not illustrated) is of Ulysses' wife, Penelope.

In the example, in step 210, Ulysses says, "Is my grandson James partying instead of studying?" Ulysses has an angry voice and a mad facial expression. In step 220, the machine detects the mood of the user (angry/mad) based on audio input (angry voice) and image input (mad facial expression). This detection is done by one or more processors, which is, for example, a Qualcomm Snapdragon processor. Also, the one or more processors are involved in detecting the meaning of the speech, such that the machine would be able to provide a conversationally relevant response that is at least partially responsive to any query or comment the user makes, and builds on the user's last statement, in the context of this conversation and the course of dealings between the machine and the user. Roy, US App. 2009/0063147, incorporated herein by reference, discusses an exemplary phonetic, syntactic and conceptual analysis drive speech recognition system. Roy's system, or a similar technology, could be used to map the words and grammatical structures uttered by the user to a "meaning", which could then be responded to, with a response converted back to speech, presented in conjunction with an anthropomorphic avatar on the screen, in order to provide a conversationally relevant output. Another embodiment of this invention might use hierarchal stacked neural networks, such as those described by Commons, U.S. Pat. No. 7,613,663, incorporated herein by reference, in order to detect the phonemes the user pronounces and to convert those phonemes into meaningful words and sentence or other grammatical structures. In one embodiment, the facial expression and/or the intonation of the user's voice are coupled with the words chosen by the user to generate the meaning. In any case, at a high level, the device may interpret the user input as a concept with a purpose, and generates a response as a related concept with a counter-purpose. The purpose need not be broader than furthering the conversation, or it may be goal-oriented. In step 230, the machine then adjusts the facial expression of the image of Penelope to angry/mad to mirror the user, as a contextually appropriate emotive response. In another embodiment, the machine might use a different facial expression in order to attempt to modify the user's mood. Thus, if the machine determines that a heated argument is an appropriate path, then a similar emotion to that of the user would carry the conversation forward. In other cases, the interface adopts a more submissive response, to defuse the aggression of the user.

Clearly, the machine has no way of knowing whether James is partying or studying without relying on external data. However, according to one embodiment of the invention, the machine can access a network, such as the Internet, or a database to get some relevant information. Here, in step 240, the machine checks the social networking website Facebook to determine James' recent activity. Facebook reveals that James got a C on his biology midterm and displays several photographs of James getting drunk and engaging in "partying" behavior. The machine then replies 250 to the user, in an angry female voice, "It is horrible. James got a C on his biology midterm, and he is drinking very heavily. Look at these photographs taken by his neighbor." The machine then proceeds to display the photographs to the user. In step 260, the user continues the conversation, "Oh my God. What will we do? Should I tell James that I will disinherit him unless he improves his grades?"

Note that a female voice was used because Penelope is a woman. In one embodiment, other features of Penelope, for example, her race, age, accent, profession, and background could be used to select an optimal voice, dialect, and intonation for her. For example, Penelope might be a 75-year-old, lifelong white Texan housewife who speaks with a strong rural Texas accent.

The machine could look up the information about James in response to the query, as illustrated here. In another embodiment, the machine could know that the user has some favorite topics that he likes to discuss (e.g., family, weather, etc.) The machine would then prepare for these discussions in advance or in real-time by looking up relevant information on the network and storing it. This way, the machine would be able to discuss James' college experience in a place where there was no Internet access. In accordance with this embodiment, at least one Internet search may occur automatically, without a direct request from the user. In yet another embodiment, instead of doing the lookup electronically, the machine could connect to a remote computer server or a remote person who would select a response to give the user. Note that the remote person might be different from the person whose photograph appears on the display. This embodiment is useful because it ensures that the machine will not advise the user to do something rash, such as disinheriting his grandson.

Note that both the machine's response to the user's first inquiry and the user's response to the machine are conversationally relevant, meaning that the statements respond to the queries, add to the conversation, and increase the knowledge available to the other party. In the first step, the user asked a question about what James was doing. The machine then responded that James' grades were bad and that he had been drunk on several occasions. This information added to the user's base of knowledge about James. The user then built on what the machine had to say by suggesting threatening to disinherit James as a potential solution to the problem of James' poor grades.

In one embodiment, the machine starts up and shuts down in response to the user's oral commands. This is convenient for elderly users who may have difficulty pressing buttons. A deactivation permits the machine to enter into a power saving low power consumption mode. In another embodiment, the microphone and camera monitor continuously the scene for the presence of an emergency. If an emergency is detected, emergency assistance services, selected for example from the group of one or more of police, fire, ambulance, nursing home staff, hospital staff, and family members might be called. Optionally, the device could store and provide information relevant to the emergency, to emergency assistance personnel. Information relevant to the emergency includes, for example, a video, photograph or audio recording of the circumstance causing the emergency. To the extent the machine is a telephone, an automated e911 call might be placed, which typically conveys the user's location. The machine, therefore, may include a GPS receiver, other satellite geolocation receiver, or be usable with a network-based location system.

In another embodiment of this invention, the machine provides a social networking site by providing the responses of various people to different situations. For example, Ulysses is not the first grandfather to deal with a grandson with poor grades who drinks and parties a lot. If the machine could provide Ulysses with information about how other grandparents dealt with this problem (without disinheriting their grandchildren), it might be useful to Ulysses.

In yet another embodiment (not illustrated) the machine implementing the invention could be programmed to periodically start conversations with the user itself, for example, if the machine learns of an event that would be interesting to the user. (E.g., in the above example, if James received an A+ in chemistry, the machine might be prompted to share the happy news with Ulysses.) To implement this embodiment, the machine would receive relevant information from a network or database, for example through a web crawler or an RSS feed. Alternatively, the machine could check various relevant web sites, such as James' social networking pages, itself to determine if there are updates. The machine might also receive proactive communications from a remote system, such as using an SMS or MMS message, email, IP packet, or other electronic communication.

Example 2

Cell Phone with Low Processing Abilities

Figure 3:
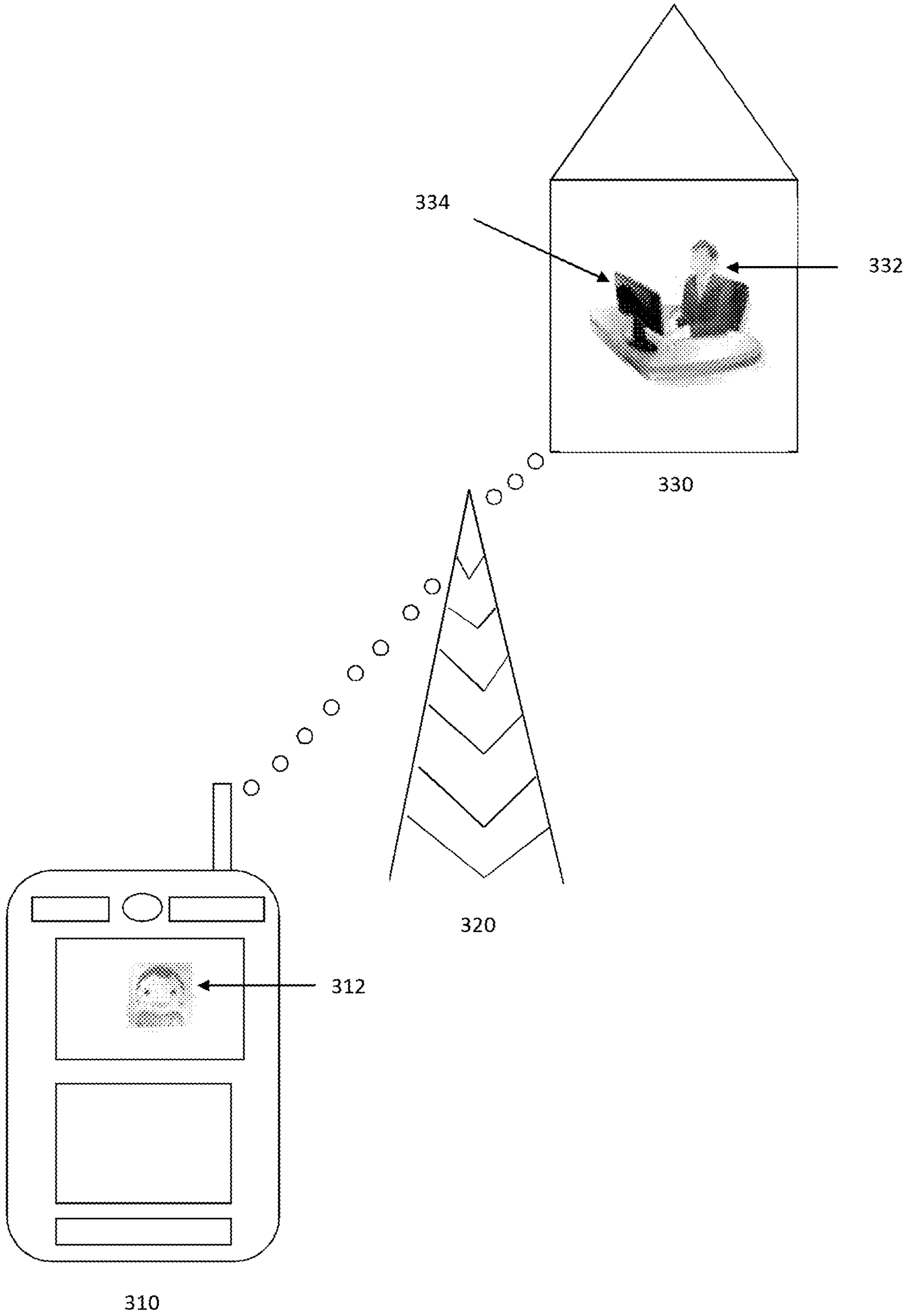
FIG. 3 illustrates an embodiment of this invention which can be run on a substantially arbitrary cell phone with low processing abilities.

This embodiment of this invention, as illustrated in FIG. 3, can be run on an arbitrary cell phone 310 connected to a cellular network, such as the GSM and CDMA networks available in the US, such as the Motorola Razr or Sony Ericsson W580. The cell phone implementing this embodiment of the invention preferably has an ability to place calls, a camera, a speakerphone, and a color screen. To use the invention, the user of the cell phone 310 places a call to a call center 330. The call could be placed by dialing a telephone number or by running an application on the phone. The call is carried over cell tower 320. In response to placing the call, an image of a person selected by the user or an avatar appears on the screen of the cell phone 310. Preferably, the call center is operated by the telephone company that provides cell phone service for cell phone 310. This way, the telephone company has control over the output on the screen of the cell phone as well as over the voice messages that are transmitted over the network.

The user says something that is heard at call center 330 by employee 332. The employee 332 can also see the user through the camera in the user's telephone. An image of the user appears on the employee's computer 334, such that the employee can look at the user and infer the user's mood. The employee then selects a conversationally relevant response, which builds on what the user said and is at least partially responsive to the query, to say to the user. The employee can control the facial expression of the avatar on the user's cell phone screen. In one embodiment, the employee sets up the facial expression on the computer screen by adjusting the face through mouse "drag and drop" techniques. In another embodiment, the computer 334 has a camera that detects the employee's facial expression and makes the same expression on the user's screen. This is processed by the call center computer 334 to provide an output to the user through cell phone's 310 speaker. If the user asks a question, such as, "What will the weather be in New York tomorrow?" the call center employee 332 can look up the answer through Google or Microsoft Bing search on computer 334.

Preferably, each call center employee is assigned to a small group of users whose calls she answers. This way, the call center employee can come to personally know the people with whom she speaks and the topic that they enjoy discussing. Conversations will thus be more meaningful to the users.

Example 3

Smart Phone, Laptop or Desktop with CPU Connected to a Network

Figure 4:
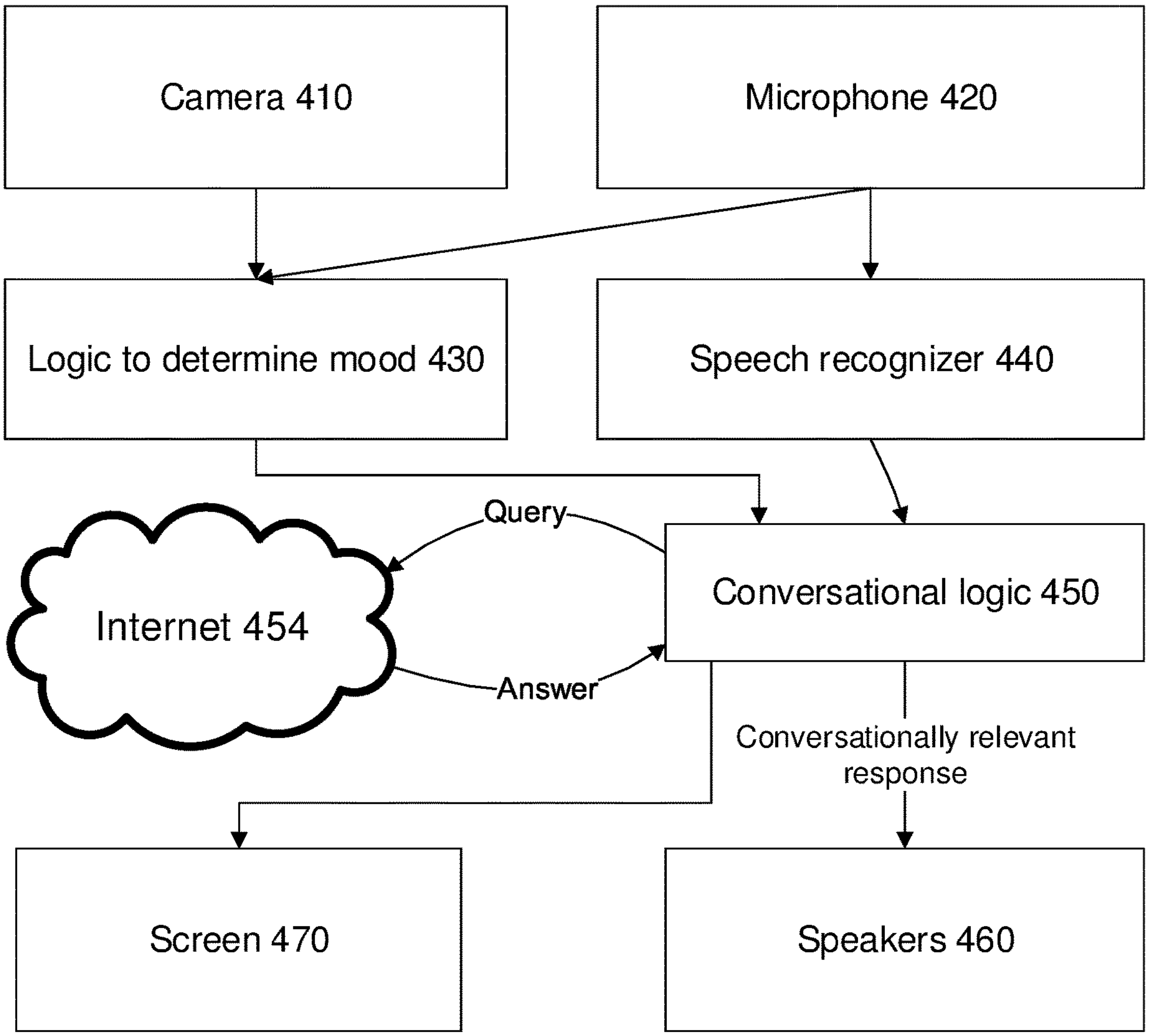
FIG. 4 illustrates a flowchart for a processor implementing an embodiment of the present invention.

Another embodiment of the invention illustrated in FIG. 4, is implemented on a smartphone, laptop computer, or desktop computer with a CPU connected to a network, such as a cellular network or an Ethernet WiFi network that is connected to the internet. The phone or computer implementing the invention has a camera 410 and a microphone 420 for receiving input from the user. The image data received by the camera and the audio data received by the microphone are fed to a logic to determine the user's mood 430 and a speech recognizer 440. The logic to determine the user's mood 430 provides as output a representation of the mood and the speech recognizer 440 provides as output a representation of the speech.

As noted above, persons skilled in the art will recognize many ways the mood-determining logic 430 could operate. For example, Bohacek, U.S. Pat. No. 6,411,687, incorporated herein by reference, teaches that a speaker's gender, age, and dialect or accent can be determined from the speech. Black, U.S. Pat. No. 5,774,591, incorporated herein by reference, teaches about using a camera to ascertain the facial expression of a user and determining the user's mood from the facial expression. Bushey, U.S. Pat. No. 7,224,790, similarly teaches about "verbal style analysis" to determine a customer's level of frustration when the customer telephones a call center. A similar "verbal style analysis" can be used here to ascertain the mood of the user. Combining the technologies taught by Bohacek, Black, and Bushey would provide the best picture of the emotional state of the user, taking many different factors into account.

Persons skilled in the art will also recognize many ways to implement the speech recognizer 440. For example, Gupta, U.S. Pat. No. 6,138,095, incorporated herein by reference, teaches a speech recognizer where the words that a person is saying are compared with a dictionary. An error checker is used to determine the degree of the possible error in pronunciation. Alternatively, in a preferred embodiment, a hierarchal stacked neural network, as taught by Commons, U.S. Pat. No. 7,613,663, incorporated herein by reference, could be used. If the neural networks of Commons are used to implement the invention, the lowest level neural network would recognize speech as speech (rather than background noise). The second level neural network would arrange speech into phonemes. The third level neural network would arrange the phonemes into words. The fourth level would arrange words into sentences. The fifth level would combine sentences into meaningful paragraphs or idea structures. The neural network is the preferred embodiment for the speech recognition software because the meanings of words (especially keywords) used by humans are often fuzzy and context sensitive. Rules, which are programmed to process clear-cut categories, are not efficient for interpreting ambiguity.

The output of the logic to determine mood 430 and the speech recognizer 440 are provided to a conversation logic 450. The conversation logic selects a conversationally relevant response 452 to the user's verbal (and preferably also image and voice tone) input to provide to the speakers 460. It also selects a facial expression for the face on the screen 470. The conversationally relevant response should expand on the user's last statement and what was previously said in the conversation. If the user's last statement included at least one query, the conversationally relevant response preferably answers at least part of the query. If necessary, the conversation logic 450 could consult the internet 454 to get an answer to the query 456. This could be necessary if the user asks a query such as "Is my grandson James partying instead of studying?" or "What is the weather in New York?"

To determine whether the user's grandson James is partying or studying, the conversation logic 450 would first convert "grandson James" into a name, such as James Kerner. The last name could be determined either through memory (stored either in the memory of the phone or computer or on a server accessible over the Internet 454) of prior conversations or by asking the user, "What is James' last name?" The data as to whether James is partying or studying could be determined using a standard search engine accessed through the Internet 454, such as Google or Microsoft Bing. While these might not provide accurate information about James, these might provide conversationally relevant information to allow the phone or computer implementing the invention to say something to keep the conversation going. Alternatively, to provide more accurate information the conversation logic 450 could search for information about James Kerner on social networking sites accessible on the Internet 454, such as Facebook, LinkedIn, Twitter, etc., as well as any public internet sites dedicated specifically to providing information about James Kerner. (For example, many law firms provide a separate web page describing each of their attorneys.) If the user is a member of a social networking site, the conversation logic could log into the site to be able to view information that is available to the user but not to the general public. For example, Facebook allows users to share some information with their "friends" but not with the general public. The conversation logic 450 could use the combination of text, photographs, videos, etc. to learn about James' activities and to come to a conclusion as to whether they constitute "partying" or "studying."

To determine the weather in New York, the conversation logic 450 could use a search engine accessed through the Internet 454, such as Google or Microsoft Bing. Alternatively, the conversation logic could connect with a server adapted to provide weather information, such as The Weather Channel, www.weather.com, or AccuWeather, www.accuweather.com, or the National Oceanic and Atmospheric Administration, www.nws.noaa.gov.

Note that, to be conversationally relevant, each statement must expand on what was said previously. Thus, if the user asks the question, "What is the weather in New York?" twice, the second response must be different from the first. For example, the first response might be, "It will rain in the morning," and the second response might be, "It sunny after the rain stops in the afternoon." However, if the second response were exactly the same as the first, it would not be conversationally relevant as it would not build on the knowledge available to the parties.

The phone or computer implementing the invention can say arbitrary phrases. In one embodiment, if the voice samples of the person on the screen are available, that voice could be used. In another embodiment, the decision as to which voice to use is made based on the gender of the speaker alone.

In a preferred embodiment, the image on the screen 470 looks like it is talking. When the image on the screen is talking, several parameters need to be modified, including jaw rotation and thrust, horizontal mouth width, lip corner and protrusion controls, lower lip tuck, vertical lip position, horizontal and vertical teeth offset, and tongue angle, width, and length. Preferably, the processor of the phone or computer that is implementing the invention will model the talking head as a 3D mesh that can be parametrically deformed (in response to facial movements during speech and facial gestures).

Example 4

Smart Clock Radio

Figure 5:
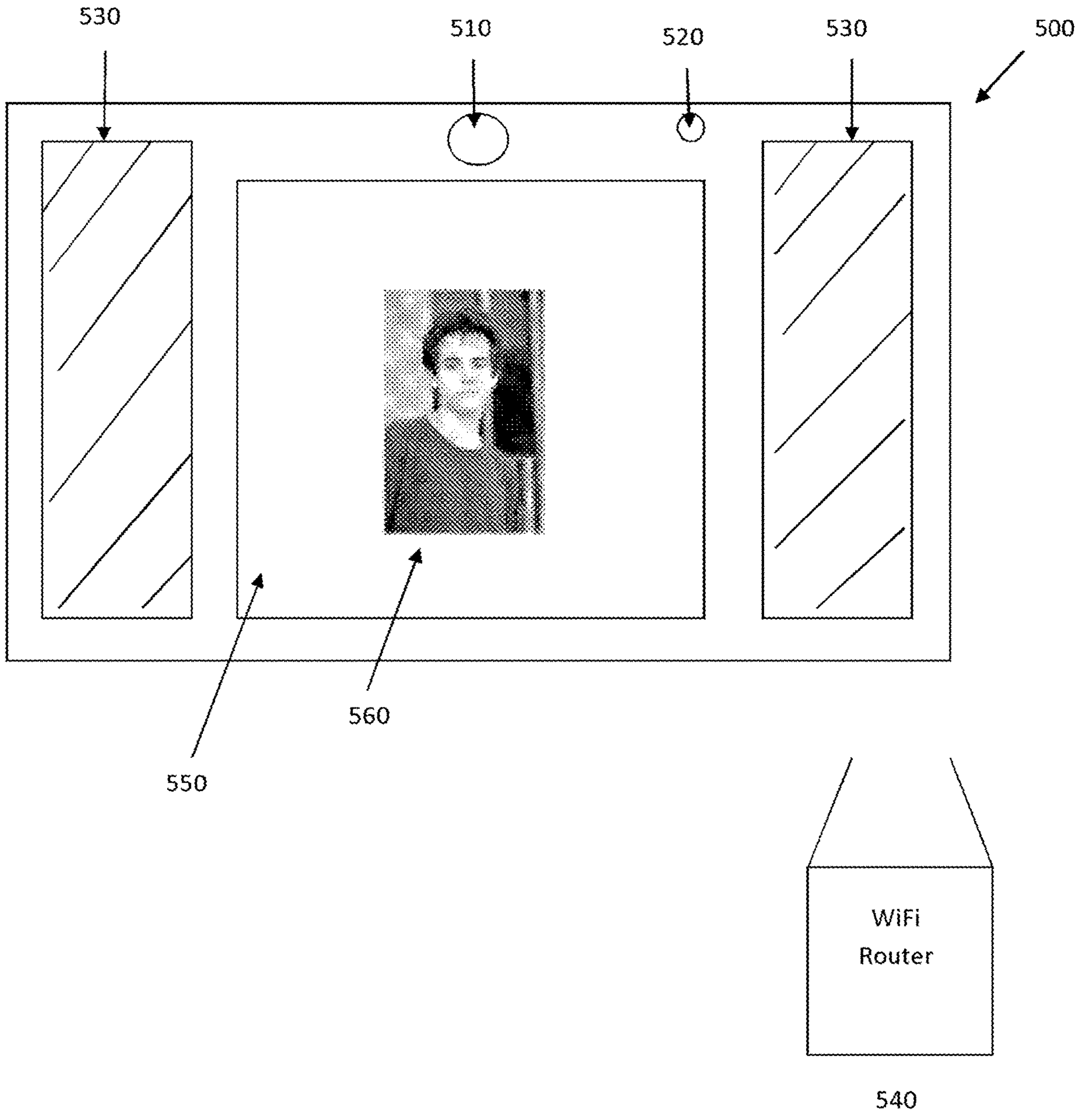
FIG. 5 illustrates a smart clock radio implementing an embodiment of the present invention.

Another embodiment of this invention illustrated in FIG. 5, includes a smart clock radio 500, such as the Sony Dash, adapted to implement the invention. The radio once again includes a camera 510 and a microphone 520 for receiving input from the user. Speakers 530 provide audio output, and a screen 550 provides visual output. The speakers 530 may also be used for other purposes, for example, to play music or news on AM, FM, XM, or Internet radio stations or to play CDs or electronic audio files. The radio is able to connect to the Internet through the home WiFi network 540. In another embodiment, an Ethernet wire or another wired or wireless connection is used to connect the radio to the Internet.

In one embodiment, the radio 500 operates in a manner equivalent to that described in the smartphone/laptop embodiment illustrated in FIG. 4. However, it should be noted that, while a user typically sits in front of a computer or cell phone while she is working with it, users typically are located further away from the clock radio. For example, the clock radio might be located in a fixed corner of the kitchen, and the user could talk to the clock radio while the user is washing the dishes, setting the table or cooking.

Therefore, in a preferred embodiment, the camera 510 is more powerful than a typical laptop camera and is adapted to viewing the user's face to determine the facial expression from a distance. Camera resolutions on the order of 8-12 megapixels are preferred, although any camera will suffice for the purposes of the invention.

Example 5

Television with Set-Top Box

Figure 6:
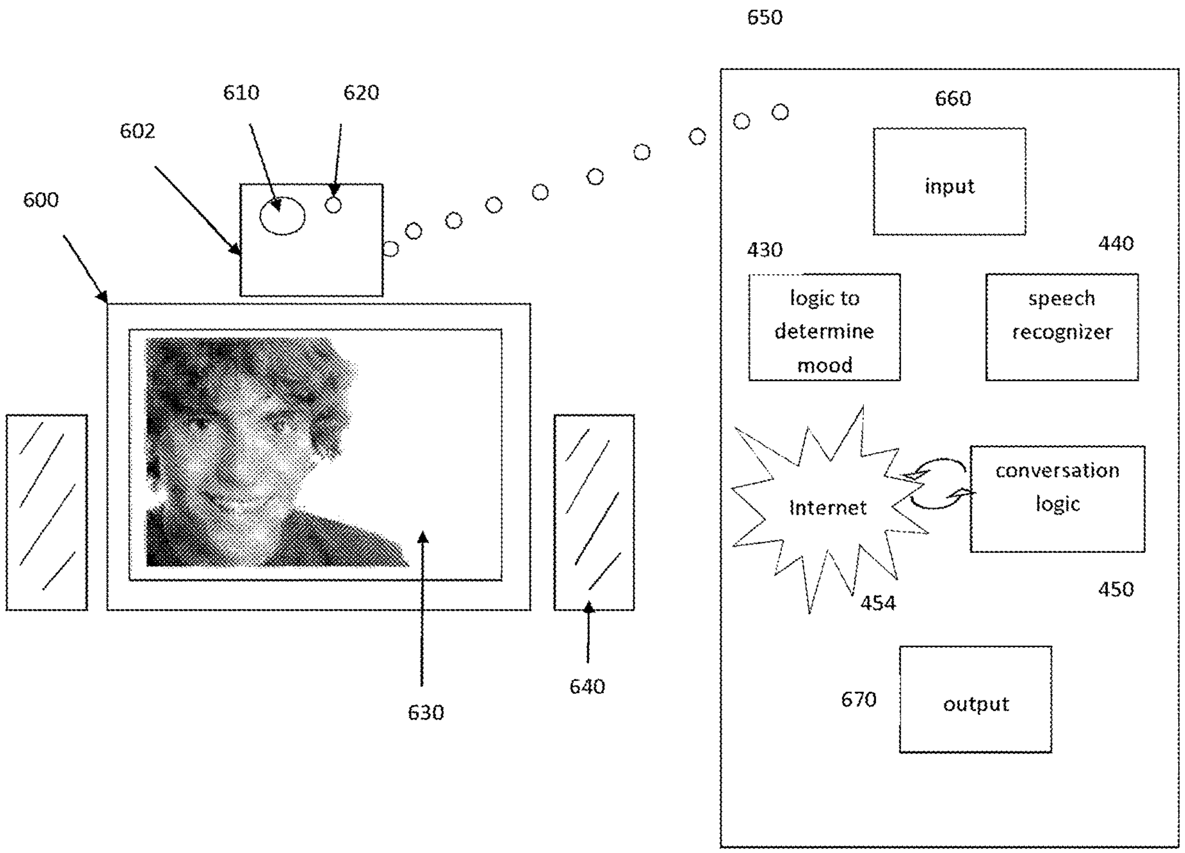
FIG. 6 illustrates a television with a set-top box implementing an embodiment of the present invention.

The next detailed embodiment of the invention illustrated in FIG. 6, is a television 600 with a set-top box (STB) 602. The STB is a standard STB, such as a cable converter box or a digital TV tuner available from many cable companies. However, the STB preferably either has or is configured to receive input from a camera 610 and microphone 620. The output is provided to the user through the TV screen 630 and speakers 640.

If the STB has a memory and is able to process machine instructions and connect to the internet (over WiFi, Ethernet or similar), the invention may be implemented on the STB (not illustrated). Otherwise, the STB may connect to a remote server 650 to implement the invention. The remote server will take as input the audio and image data gathered by the STB's microphone and camera. The output provided is an image to display in screen 630 and audio output for speakers 640.

The logic to determine mood 430, speech recognizer 440, and the conversation logic 450, which connects to the Internet 454 to provide data for discussion all operate in a manner identical to the description of FIG. 4.

When setting up the person to be displayed on the screen, the user needs to either select a default display or send a photograph of a person that the user wishes to speak with to the company implementing the invention. In one embodiment, the image is transmitted electronically over the Internet. In another embodiment, the user mails a paper photograph to an office, where the photograph is scanned, and a digital image of the person is stored.

Example 6

Robot with a Face

Figure 7:
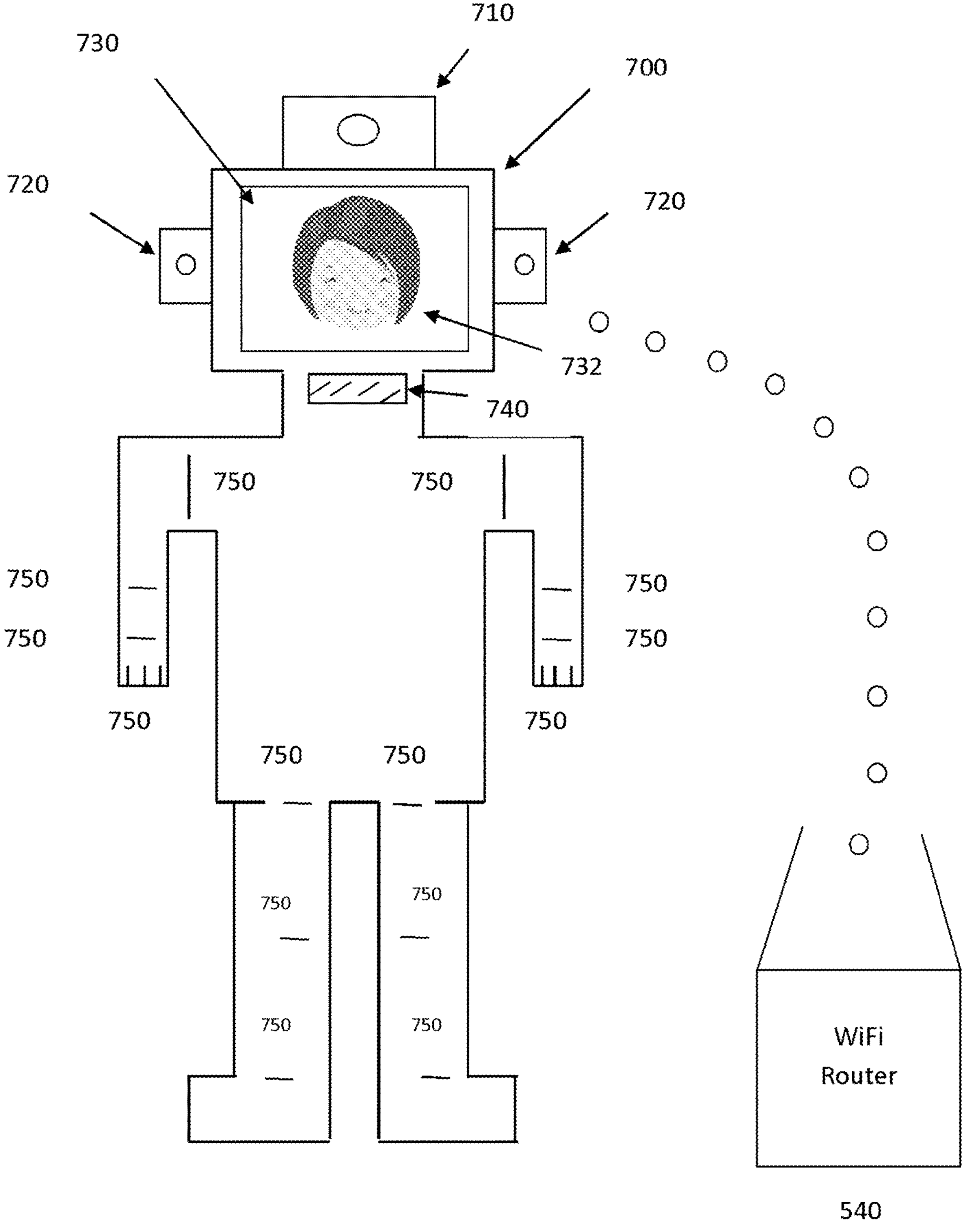
FIG. 7 illustrates a special purpose robot implementing an embodiment of the present invention.

FIG. 7 illustrates a special purpose robot 700 designed to implement an embodiment of this invention. The robot receives input through a camera 710 and at least one microphone 720. The output is provided through a screen 730, which displays the face of a person 732, or non-human being, which is either selected by the user or provided by default. There is also at least one speaker 740. The robot further has joints 750, which it can move in order to make gestures.

The logic implementing the invention operates in a manner essentially identical to that illustrated in FIG. 4. In a preferred embodiment, all of the logic is internal to the robot. However, other embodiments, such as a processor external to the robot connecting to the robot via the Internet or via a local connection, are possible.

There are some notable differences between the present embodiment and that illustrated in FIG. 4. In a preferred embodiment, the internet connection, which is essential for conversation logic 450 of FIG. 4 is provided by WiFi router 540 and the robot 700 is able to connect to WiFi. Alternatively, the robot 700 could connect to the internet through a cellular network or through an Ethernet cable. In addition to determining words, voice tone, and facial expression, the conversation logic 450 can now suggest gestures, e.g., wave the right hand, point middle finger, etc. to the robot.

In one embodiment, the camera is mobile, and the robot rotates the camera so as to continue looking at the user when the user moves. Further, the camera is a three-dimensional camera comprising a structured light illuminator. Preferably, the structured light illuminator is not in a visible frequency, thereby allowing it to ascertain the image of the user's face and all of the contours thereon.

Structured light involves projecting a known pattern of pixels (often grids or horizontal bars) on to a scene. These patterns deform when striking surfaces, thereby allowing vision systems to calculate the depth and surface information of the objects in the scene. For the present invention, this feature of structured light is useful to calculate and to ascertain the facial features of the user. Structured light could be outside the visible spectrum, for example, infrared light. This allows for the robot to effectively detect the user's facial features without the user being discomforted.

In a preferred embodiment, the robot is completely responsive to voice prompts and has very few buttons, all of which are rather larger. This embodiment is preferred because it makes the robot easier to use for elderly and disabled people who might have difficulty pressing small buttons.

In this disclosure, we have described several embodiments of this broad invention. Persons skilled in the art will definitely have other ideas as to how the teachings of this specification can be used. It is not our intent to limit this broad invention to the embodiments described in the specification. Rather, the invention is limited by the following claims.

Figure 8:
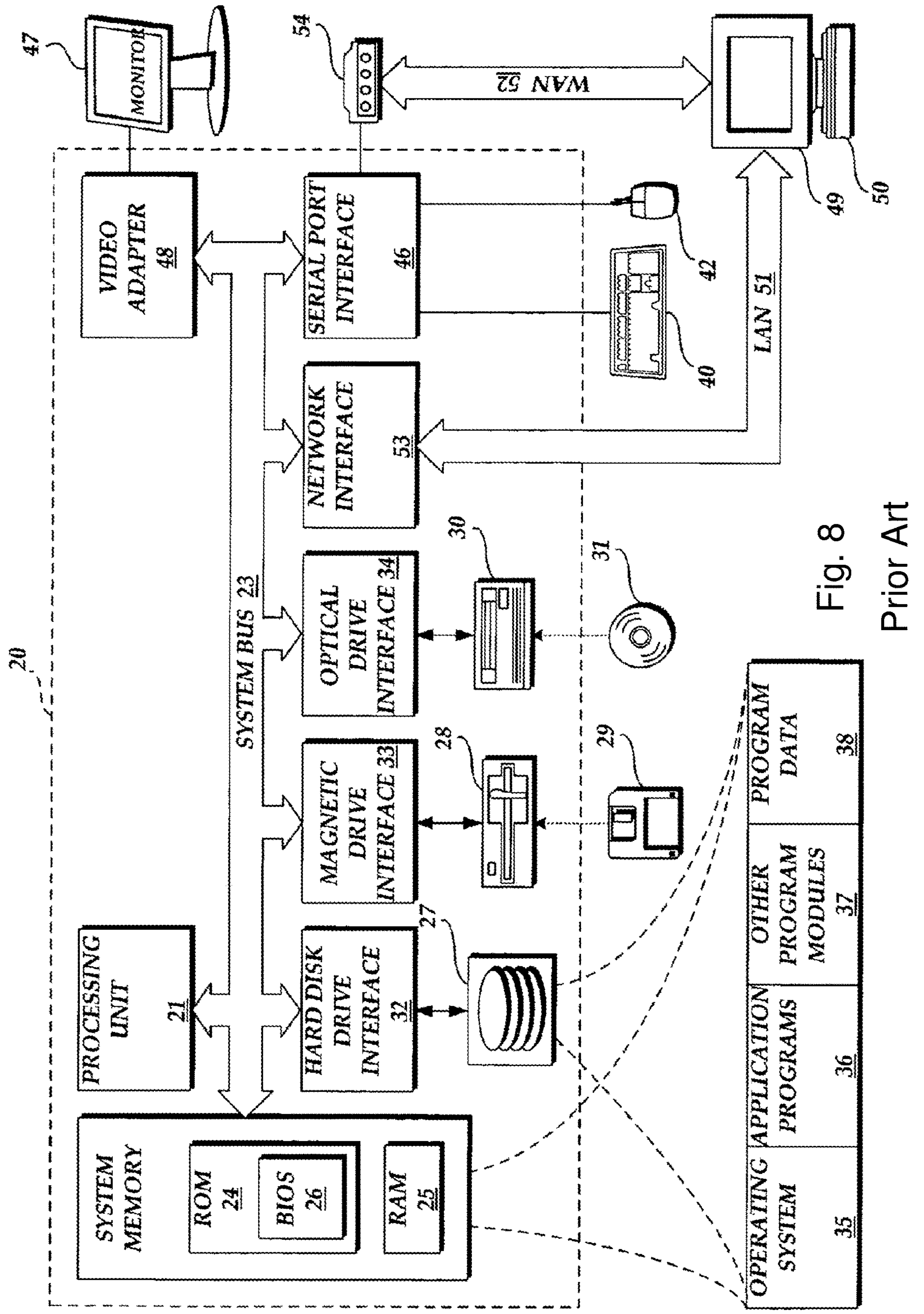
Fig. 8 Prior Art
FIG. 8 shows a prior art computer system.

With reference to FIG. 8, a generic system, such as disclosed in U.S. Pat. No. 7,631,317, for processing program instructions is shown which includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that help to transfer information between elements within the personal computer 20, such as during start-up, is stored in ROM 24. In one embodiment of the present invention on a server computer 20 with a remote client computer 49, commands are stored in system memory 22 and are executed by processing unit 21 for creating, sending, and using self-descriptive objects as messages over a message queuing network in accordance with the invention. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as flash memory, network storage systems, magnetic cassettes, random access memories (RAM), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial data interface 46 that is coupled to the system bus, but may be collected by other interfaces, such as a parallel port, game port or a universal serial bus (USB). A monitor 47 or another type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49, through a packet data network interface to a packet switch data network. The remote computer 49 may be another personal computer, a server, a router, a network PC, a peer device or other common network node, and typically includes many or all of the elements described above relative to the personal computer 20, although only a memory storage device 50 has been illustrated in FIG. 8. The logical connections depicted in FIG. 8 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other elements for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other elements for establishing a communications link between the computers may be used.

Typically, a digital data stream from a superconducting digital electronic processing system may have a data rate which exceeds a capability of a room temperature processing system to handle. For example, complex (but not necessarily high data rate) calculations or user interface functions may be more efficiently executed on a general-purpose computer than a specialized superconducting digital signal processing system. In that case, the data may be parallelized or decimated to provide a lower clock rate, while retaining essential information for downstream processing.

The present embodiments are to be considered in all respects as illustrative and not restrictive, and all changes which come within the meaning and range of equivalency of the claims are therefore intended to be embraced therein. The invention may be embodied in other specific forms without departing from the spirit or essential characteristics thereof. The disclosure shall be interpreted to encompass all of the various combinations and permutations of the elements, steps, and claims disclosed herein, to the extent consistent, and shall not be limited to specific combinations as provided in the detailed embodiments.

What is claimed is:

1. A method comprising:

determining a topic of interest to a user, based on a natural language input from the user;

automatically determining a context of at least one of the user and an activity of the user, by analyzing with at least one automated processor (a) at least one of a plurality of user-specific data inputs, (b) a stored history of past interactions with the user, and (c) a stored user profile associated with the user;

automatically communicating the determined topic of interest to the user through a communication port to a remote server;

automatically receiving in real time, at least one unit of information stored in the remote server dependent on the topic of interest through the communication port without requiring an express request from the user;

automatically presenting a natural language output controlled by the at least one automated processor using an automated conversational agent comprising an anthropomorphic object configured to engage in a context-appropriate interactive spoken natural language conversation relating to the topic of interest according to conversational logic, and employing a learning system that is adaptive and changes internally as a consequence of experience, conveying the received at least one unit of information to the user in a manner dependent on the determined context of the at least one of the user and the activity of the user, said automatically presenting comprising implementing an automated conversational agent through a human-machine user interface which interacts with the user according to conversational logic; and brokering an ad or an incentive in real time by communication with a report server without communication of an express request for the ad of the incentive, dependent on at least one of the determined context of the at least one of the user and the activity of the user, and the topic of interest to the user.

2. The method according to claim 1, further comprising automatically determining an emotional state of the user, wherein the presenting is further dependent on the detected emotional state of the user and a desired future emotional state of the user.

3. The method according to claim 1, further comprising receiving spoken language from the user and outputting spoken language from an automated anthropomorphic object as part of an interactive spoken natural language conversation.

4. The method according to claim 1, wherein the determining the topic of interest to the user is further based on an automated analysis of the stored history of past interactions.

5. The method according to claim 1, wherein said automatically communicating through the communication port comprises communicating information dependent on the topic of interest to a plurality of remote server databases, and said automatically receiving information stored in the remote server dependent on the topic of interest through the communication port comprises automatically receiving the information from the plurality of remote server databases.

6. The method according to claim 5, further comprising automatically selecting a subset of the received information from the plurality of remote server databases selectively dependent on the context of the at least one of the user and the activity of the user.

7. The method according to claim 1, further comprising automatically receiving sponsored or advertising content through the communication port that is brokered in real time, and automatically presenting the real time brokered sponsored or advertising content to the user through the human-machine user interface.

8. The method according to claim 7, wherein the real time brokered sponsored or advertising content is related to the topic of interest and is sensitive to the determined context.

9. The method according to claim 7, wherein the sponsored or advertising content is related to a user profile associated with the user.

10. A conversational agent system comprising:

an input port configured to receive a natural language input from a user;

at least one automated processor employing an adaptive learning system that changes internally as a consequence of experience, configured to:

analyze at least one of a plurality of user-specific data inputs, a stored history of past interactions with the user, and a stored user profile associated with the user, to determine a context of at least one of the user and an activity of the user;

control an automated conversational agent to in dependence on the adaptive learning system, and to engage in a context-appropriate interactive natural language conversation with the user comprising the topic of interest; and broker an ad or an incentive in real time by communication with a report server without communication of an express request for the ad or an incentive, dependent on at least one of the context of at least one of the user and the activity of the user, and the topic of interest;

a communication port configured to:

communicate the determined topic of interest to a remote server;

receive information from the remote server stored in a remote database dependent on the topic of interest;

receive the brokered ad or incentive; and a human-machine user interface comprising the automated conversational agent which interacts with the user according to natural language conversational logic to present the received ad or incentive and received information to the user in a manner dependent on the context of at least one of the user and the activity of the user.

11. The system according to claim 10, wherein the presentation is further dependent on an emotional state of the user.

12. The system according to claim 10, wherein the at least one processor is further configured to use the stored history of past interactions with the user to determine the topic of interest to the user.

13. The system according to claim 1, wherein the communication port is configured to communicate information dependent on the topic of interest to a plurality of remote servers, and to receive the information from the plurality of remote servers.

14. The system according to claim 13, wherein the at least one automated processor is further configured to select a subset of the received information from the plurality of remote databases selectively dependent on the context of at least one of the user and the activity of the user.

15. The system according to claim 10, wherein the ad or incentive is synthesized within the context-appropriate interactive natural language conversation.

16. The system according to claim 15, wherein the ad or incentive is brokered dependent on the stored user profile associated with the user.

17. A non-transitory computer readable medium, containing instructions for controlling at least one automated processor, comprising:

instructions for determining a topic of interest to a user, based on a natural language input from the user;

instructions for determining a context of at least one of the user and an activity of the user, by analyzing with at least one automated processor of at least one of a plurality of user-specific data inputs, a stored history of past interactions with the user, and a stored user profile associated with the user;

instructions for communicating the determined topic of interest to the user through a communication port to a remote server;

instructions for receiving information stored in the remote server dependent on the topic of interest through the communication port;

instructions for brokering an ad or incentive in real time personalized based on the topic of interest selected in dependence on the context of at least one of the user and the activity of the user;

instructions for presenting a natural language output and employing an adaptive learning system that changes internally as a consequence of experience, conveying the received information in a manner dependent on the context of at least one of the user and the activity of the user, and the ad or incentive to the user;

instructions for implementing a conversational agent through a human-machine user interface which interacts with the user according to conversational logic; and, instructions for controlling the automated conversational agent to engage in a context-appropriate interactive natural language conversation with the user comprising the topic of interest.

18. The non-transitory computer readable medium according to claim 17, wherein the conversation agent comprises an anthropomorphic object having a head presented through an audio-visual output, further comprising:

instructions for analyzing an intonation of the user's voice;

instructions for animating the head based on a parametrically deformable 3D mesh model to represent facial movements comprising speech and facial gestures; and instructions for implementing the conversational agent which interacts with the user using speech dependent on the intonation of the user's voice.

* * * * *